United States Patent

[11] 3,584,528

| [72] | Inventors | Jean Leblond;<br>Jean Biet, both of Compiegne (Oise), France |
|---|---|---|
| [21] | Appl. No. | 794,562 |
| [22] | Filed | Jan. 28, 1969 |
| [45] | Patented | June 15, 1971 |
| [73] | Assignee | Uniroyal Englebert France S.A.<br>Paris, France |

[54] BIAS CUTTER
35 Claims, 37 Drawing Figs.

[52] U.S. Cl. ................................................. 83/208,
83/238, 83/282, 83/578
[51] Int. Cl. ................................................. B26d 5/20
[50] Field of Search ................................................. 83/208,
210, 238, 282, 578, 42, 473, 475, 477, 484, 486,
487

[56] References Cited
UNITED STATES PATENTS
3,077,803  2/1963  Hasselquist.................. 83/486 X

| 3,138,049 | 6/1964 | Flory et al.............. | 83/486 X |
| 3,406,601 | 10/1968 | Clifford.................. | 83/208 X |
| 3,463,040 | 8/1969 | Pouilloux................ | 83/487 X |
| 3,503,291 | 3/1970 | Pouilloux................ | 83/42 |

*Primary Examiner*—Frank T. Yost
*Attorney*—Henry Sternberg

ABSTRACT: Apparatus for bias cutting, at relatively low angles, a tire material including an elastomer having embedded therein a plurality of longitudinally extending wire cords. The material is intermittently advanced alternately longer and shorter distances with the length of these distances chosen so as to compensate for the distortions in the material caused by cutting, at said relatively low angle, in alternately a forwardly and rearwardly direction relative to the direction of advance of the material. The angle of inclination of the cutting axis is adjustable by simultaneous adjustment of the end extremity of the feeding arrangement and the cutter path.

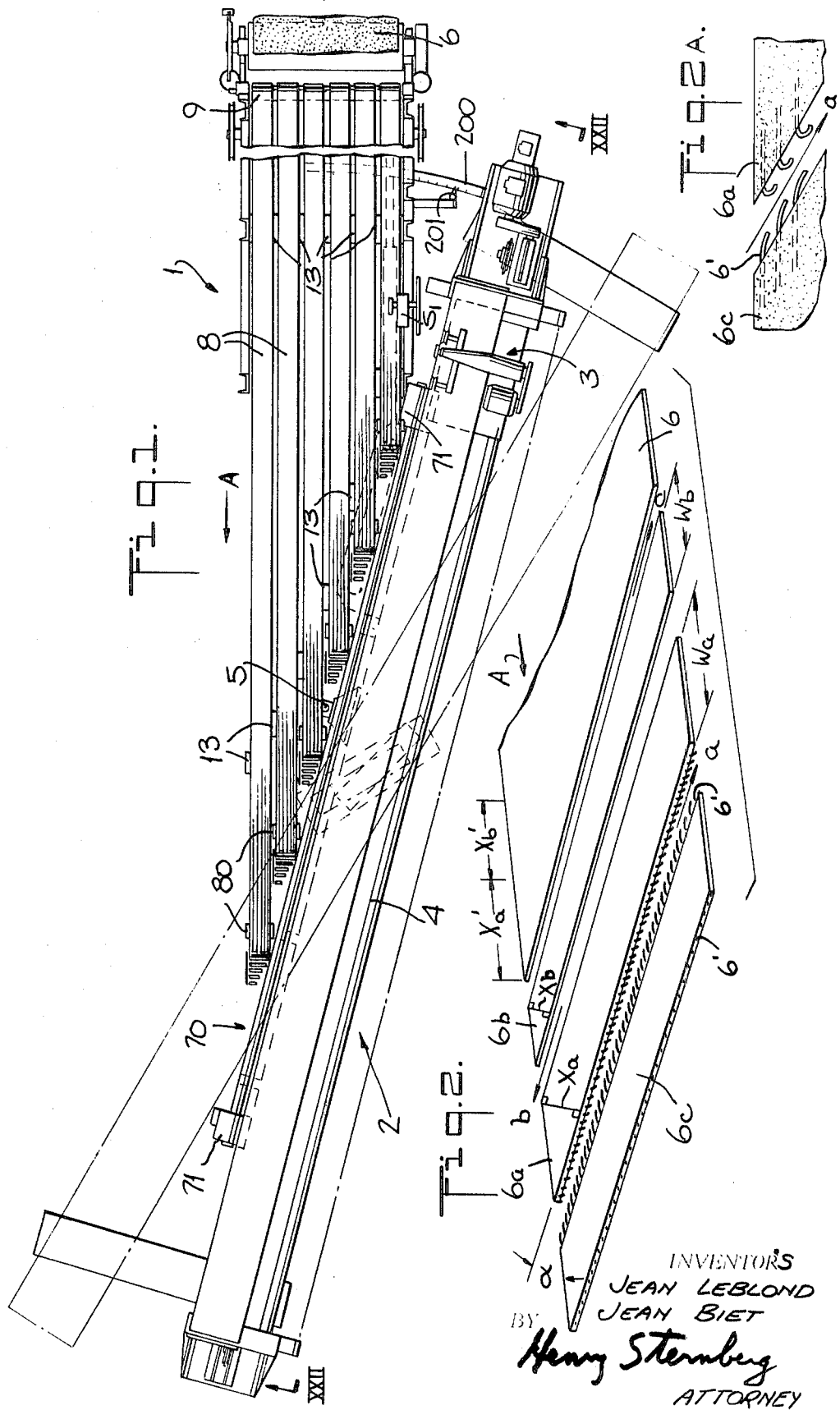

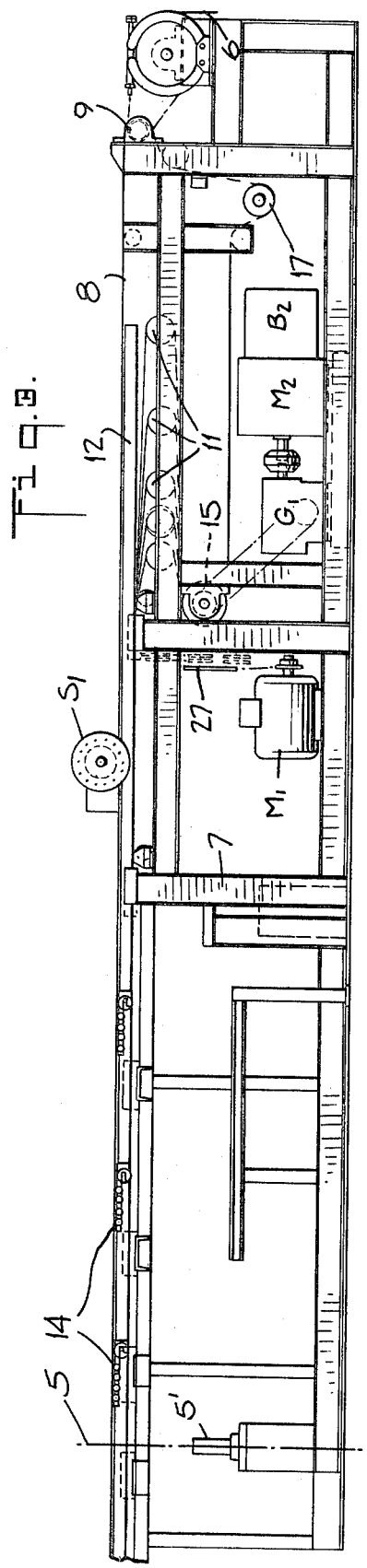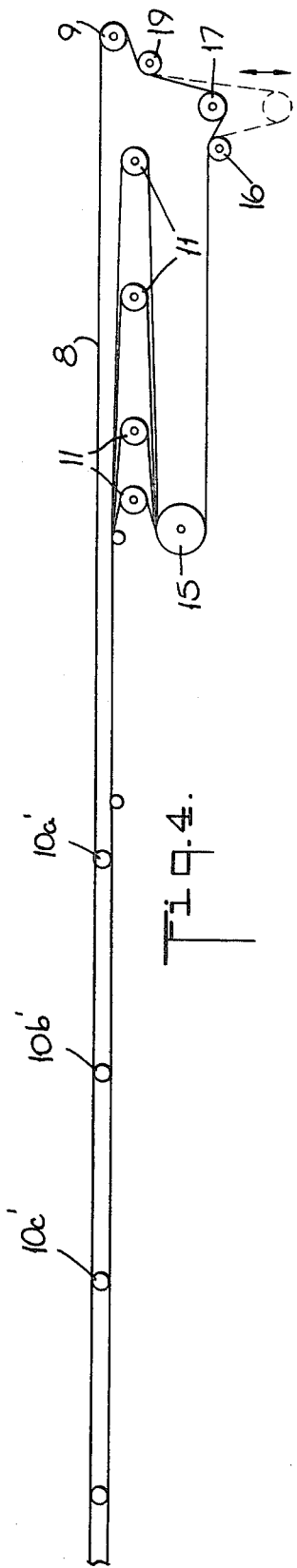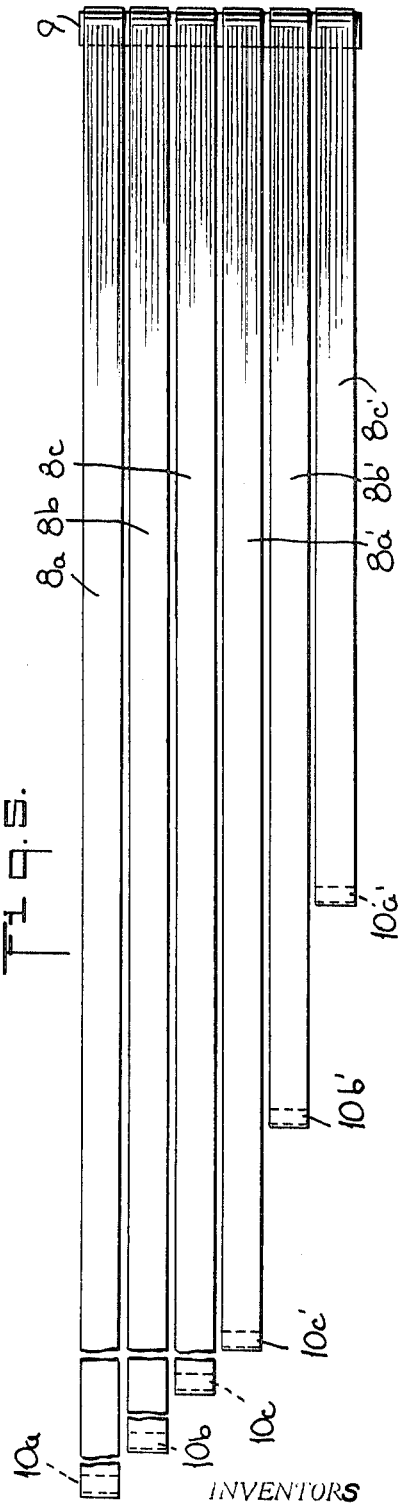

INVENTORS
JEAN LEBLOND
JEAN BIET
BY Henry Sternberg
ATTORNEY

INVENTORS
JEAN LEBLOND
JEAN BIET
BY Henry Sternberg
ATTORNEY

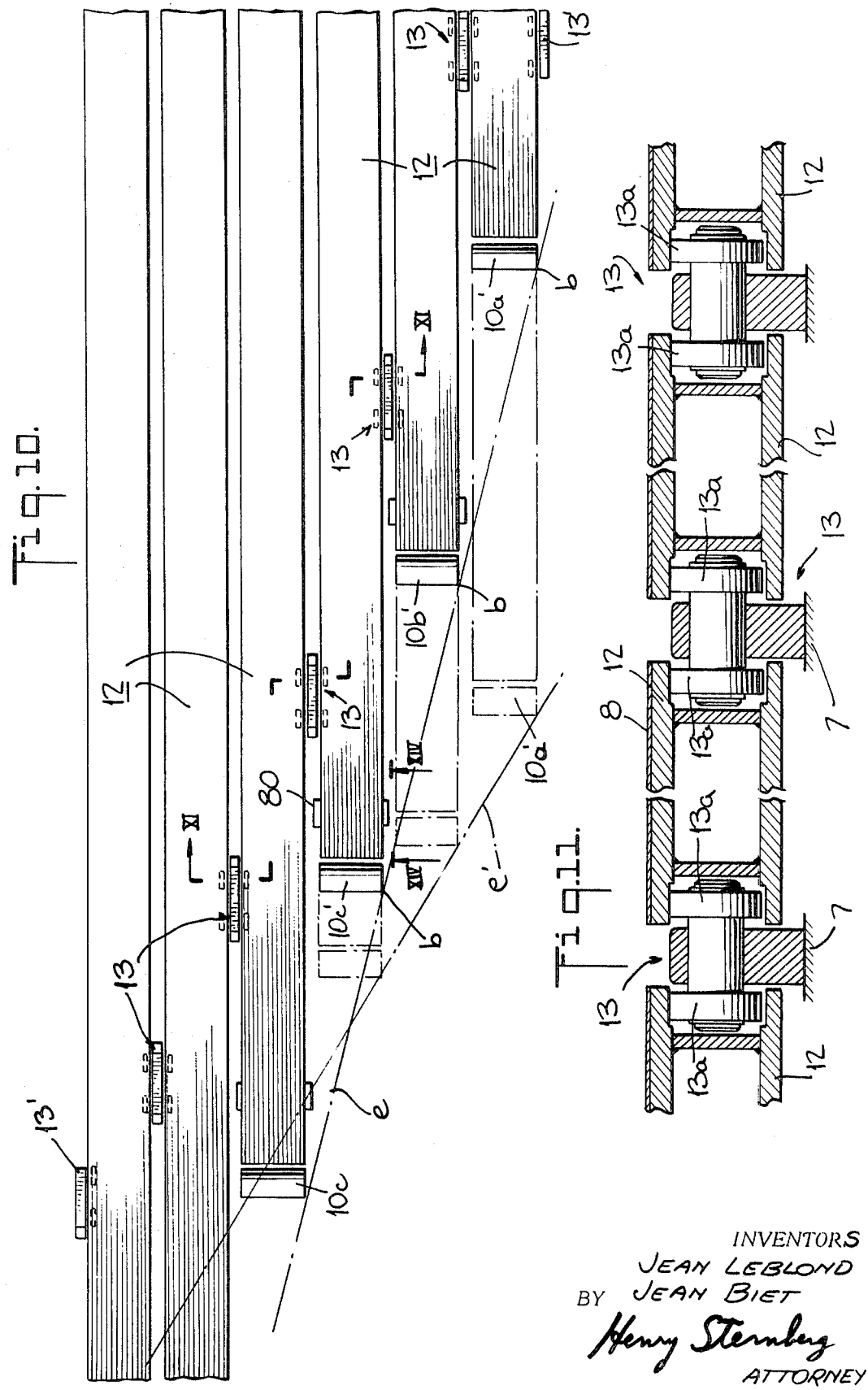

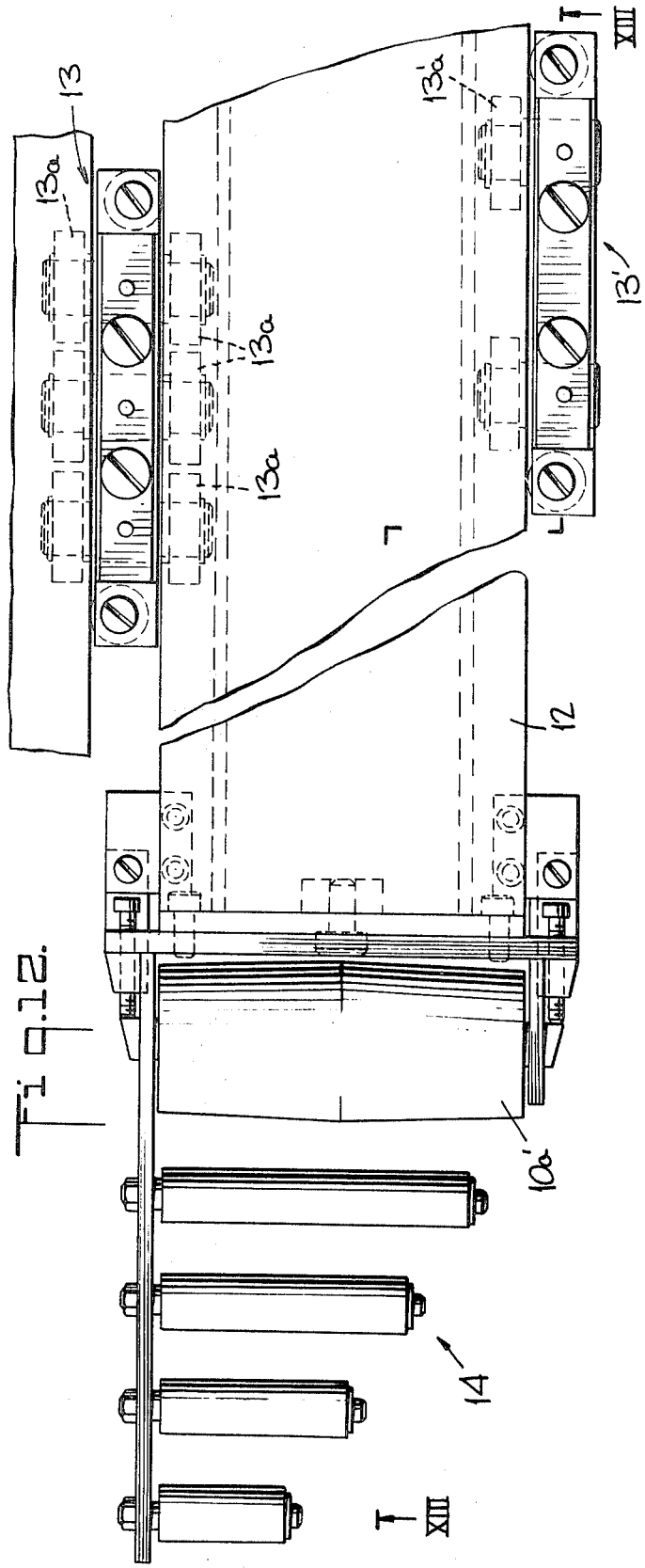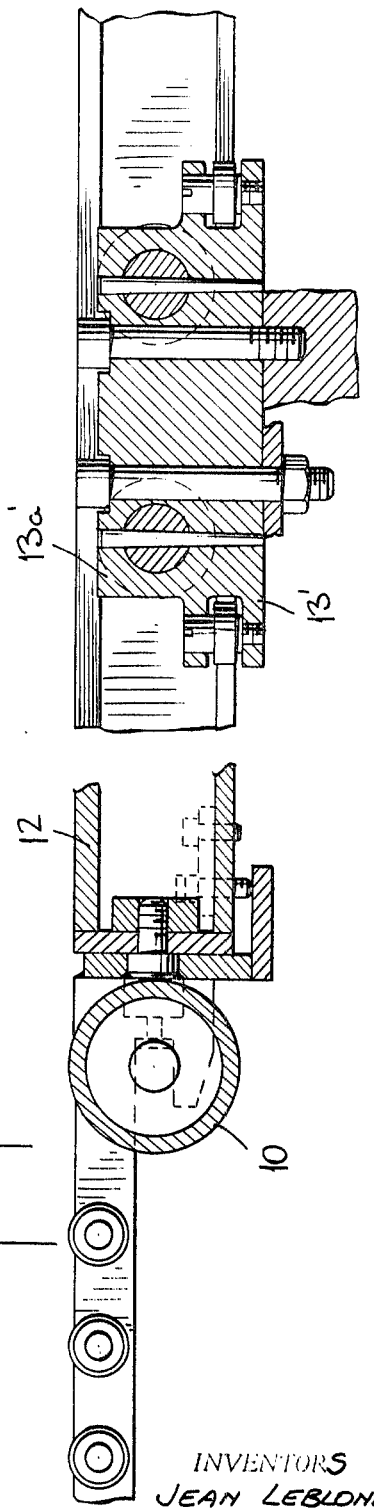
Fig.12.
Fig.13.
INVENTORS
JEAN LEBLOND
JEAN BIET
Henry Sternberg
ATTORNEY

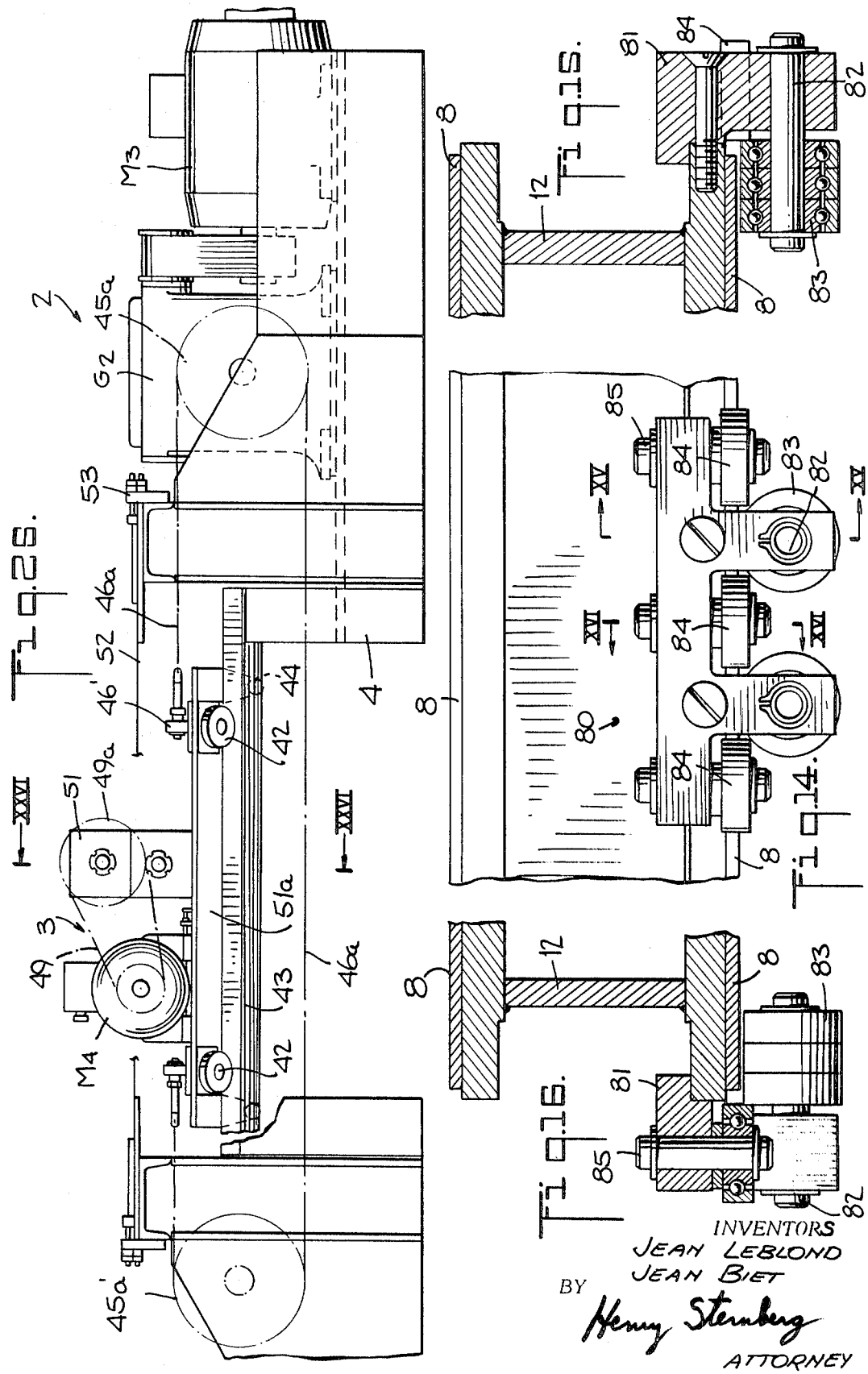

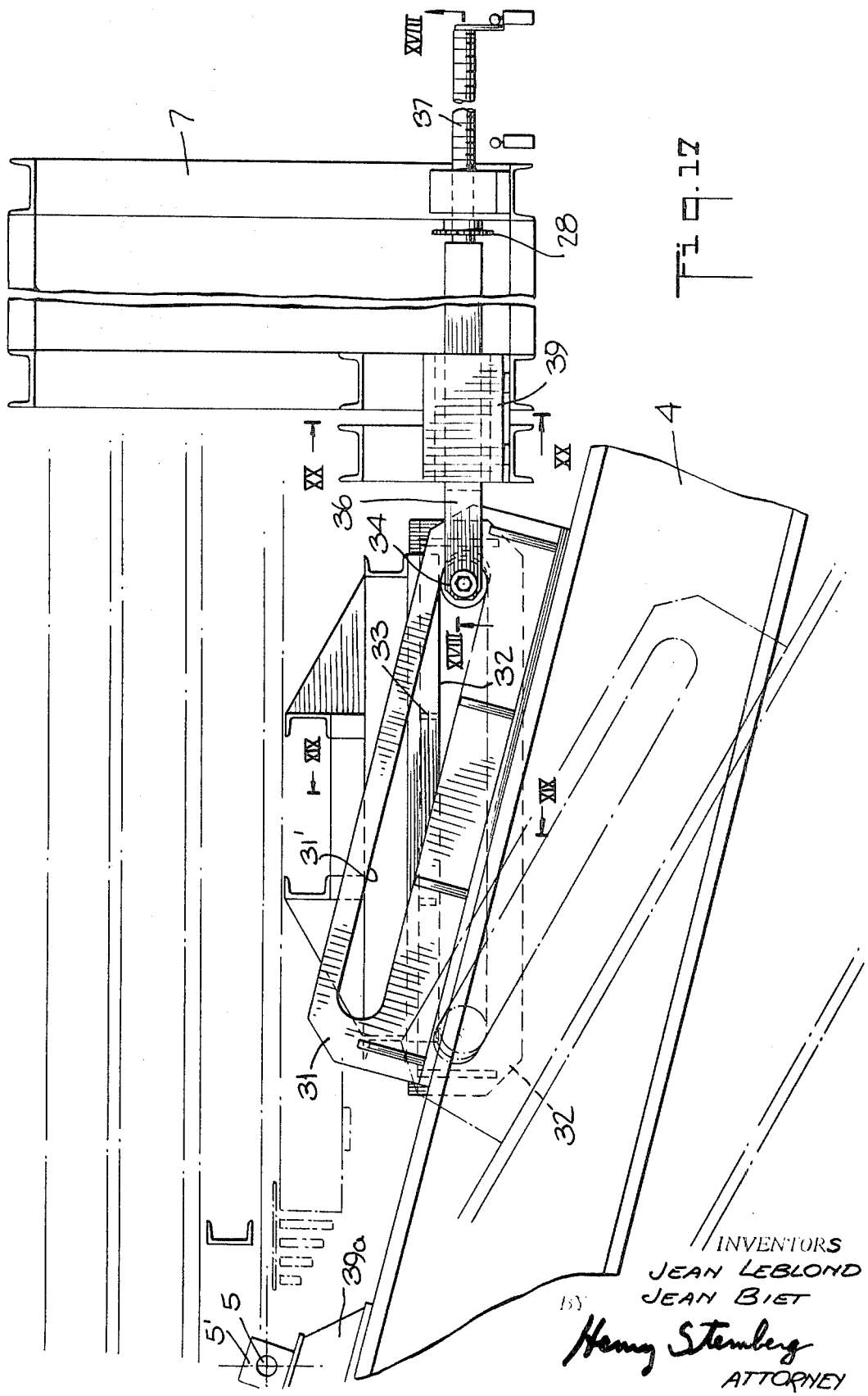

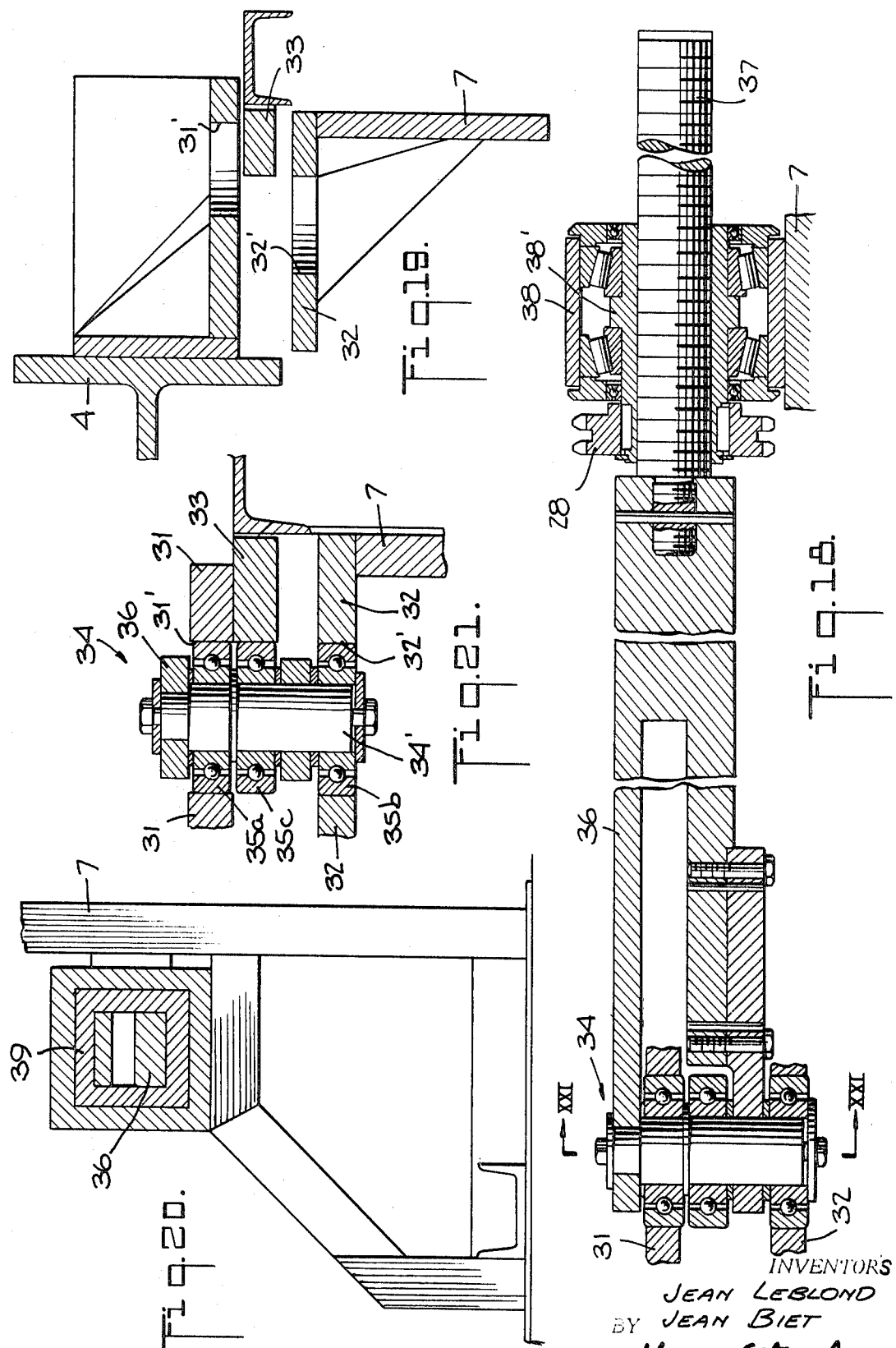

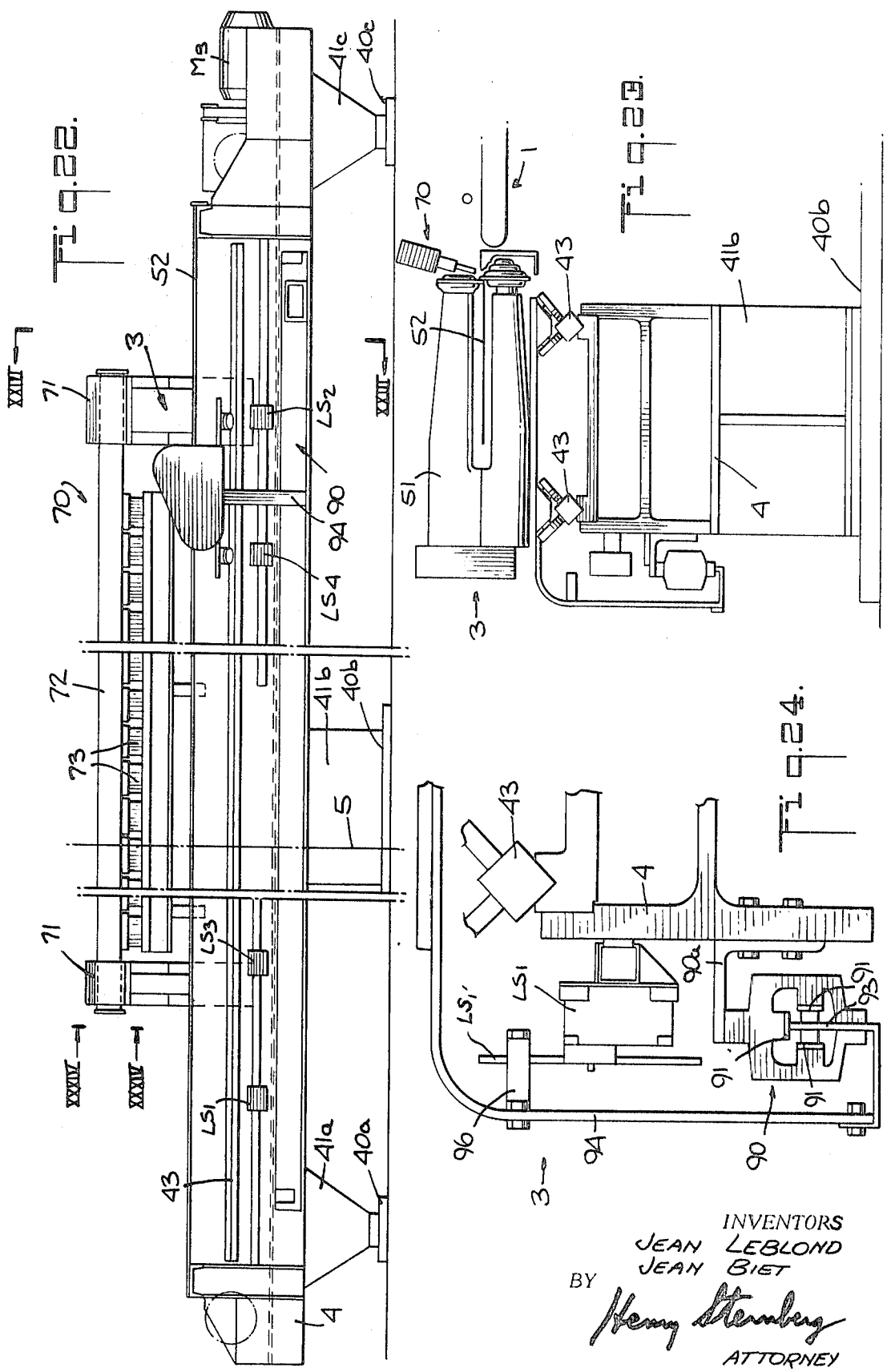

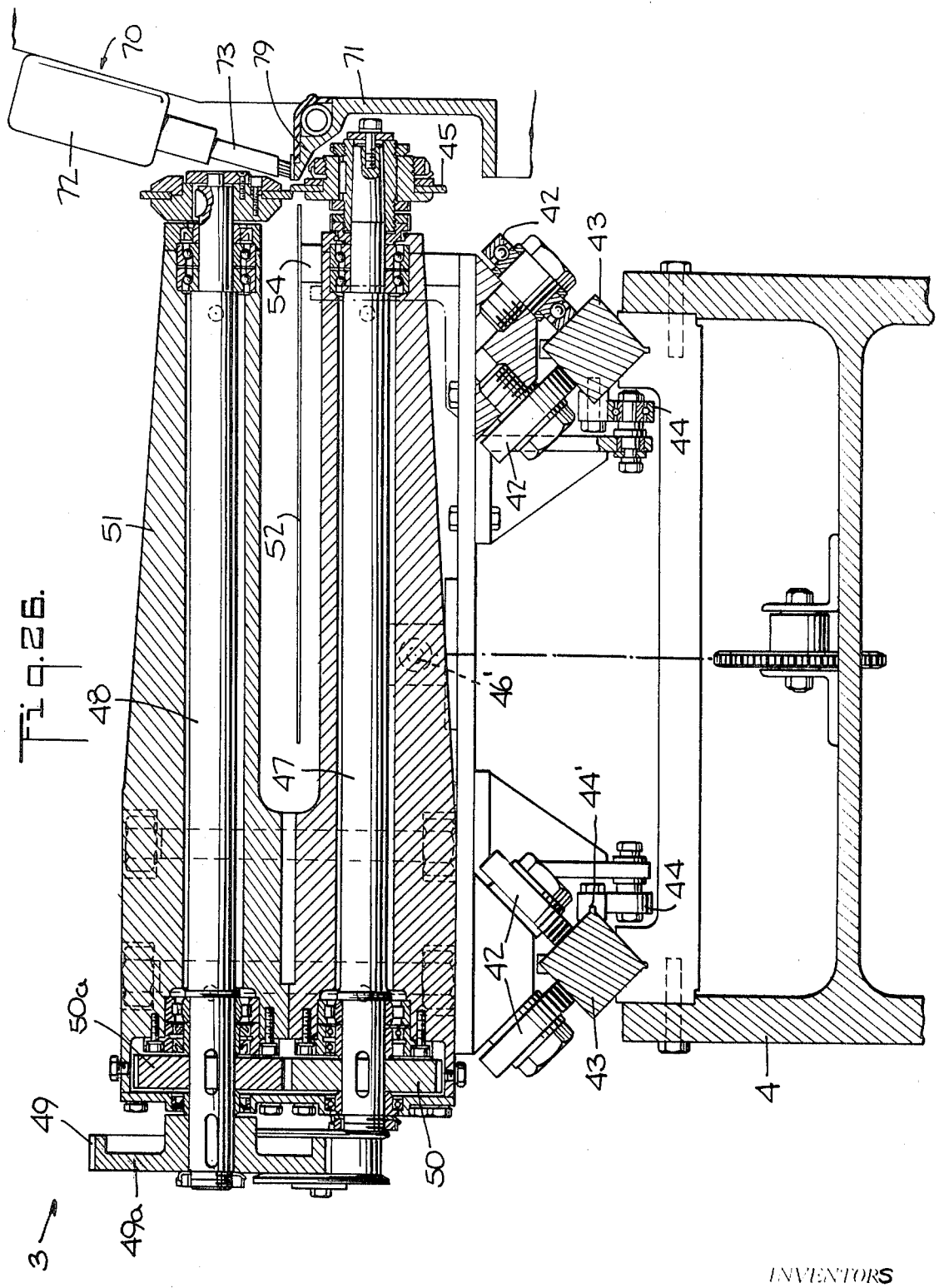

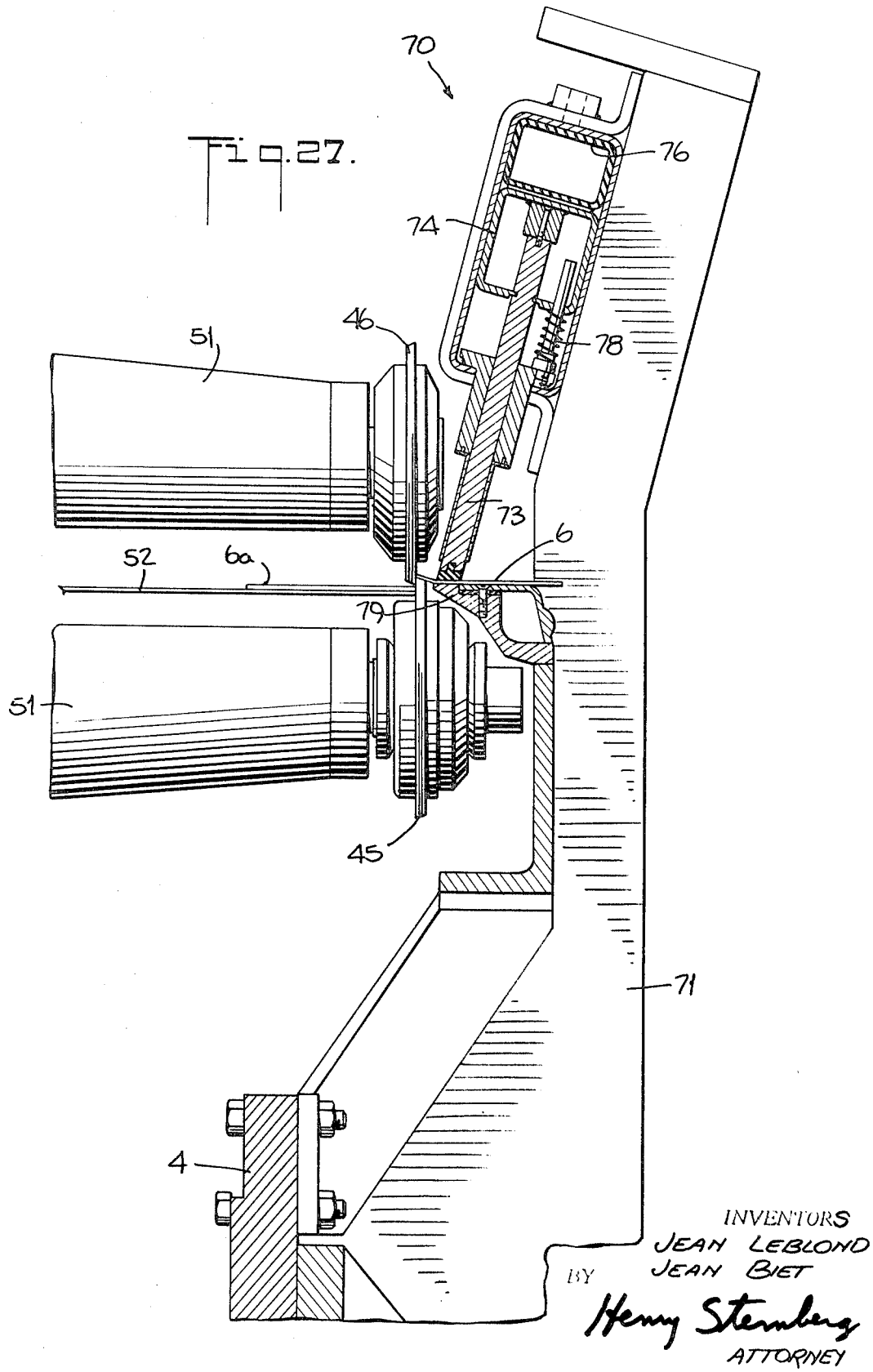

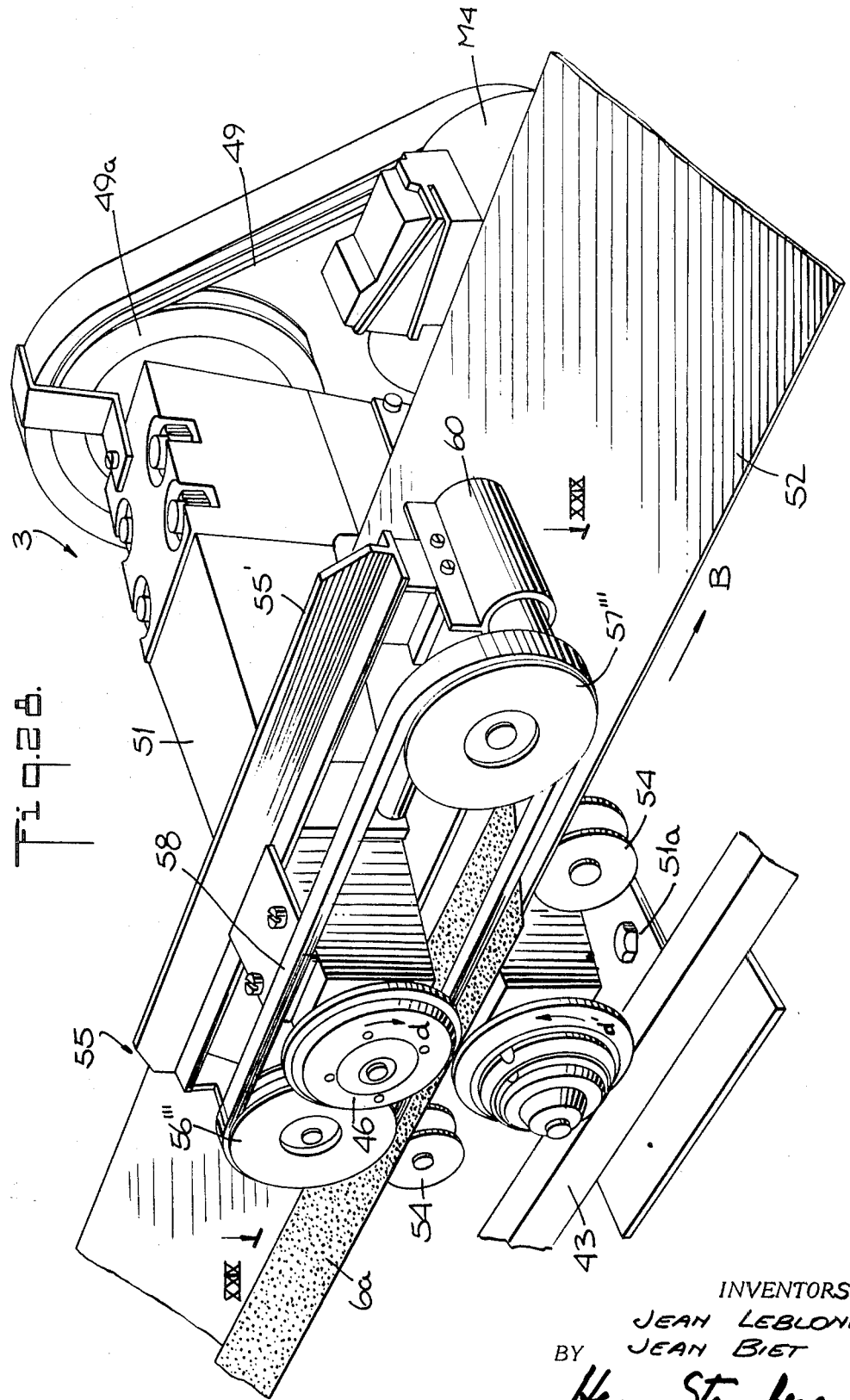

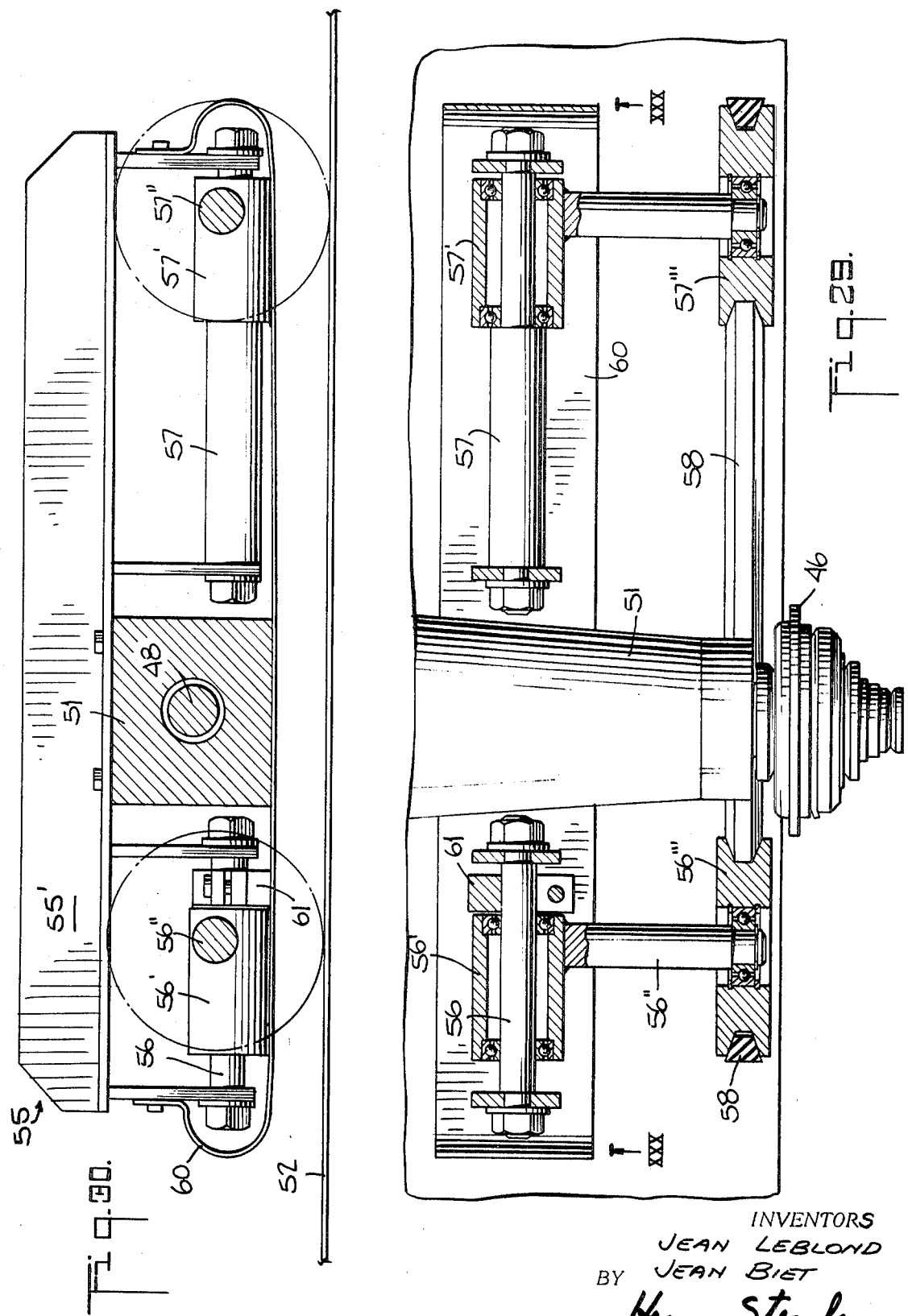

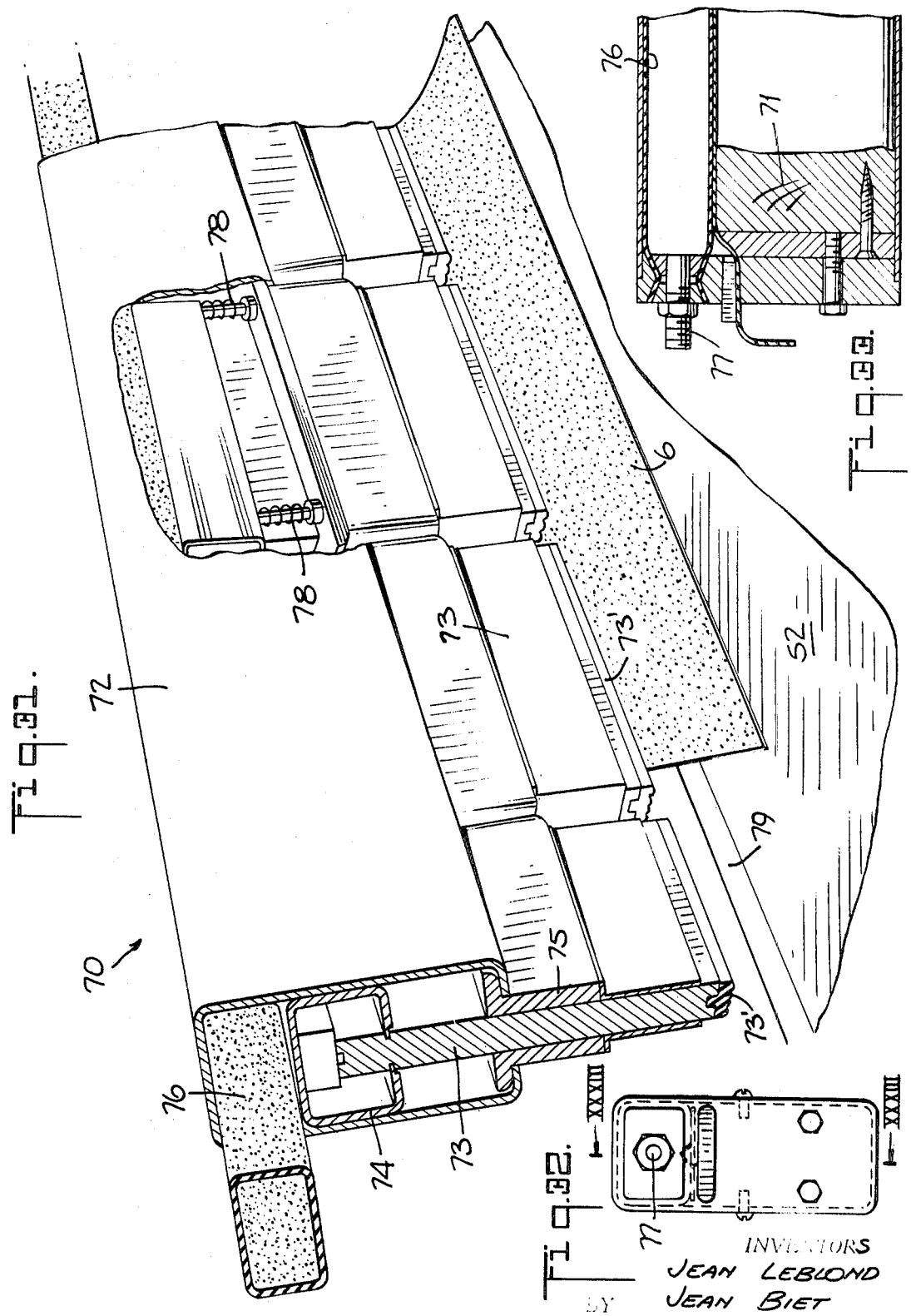

INVENTORS
JEAN LEBLOND
JEAN BIET
BY Henry Sternberg
ATTORNEY

BIAS CUTTER

This invention relates to an improved cutting machine, and more particularly to an improved bias cutter for automatically cutting a continuous length of metal-reinforced tire material into bias-cut strips of definite width.

Bias cut, rubber-coated, fabrics are conventionally used in the manufacture of rubber tires to add strength to the completed tire. Prior to being bias cut, the fabric is manufactured as a continuous web or strip of rubber-coated material having parallely arranged structural cords running in the longitudinal direction of the web. After fabrication of a calendered web of such tire fabric, having longitudinally arranged structural cords, the fabric is usually cut into rhombic-shaped sections by a bias-cutting operation and the cut sections are manually spliced or joined together in overlapped endwise relationship to form a second continuous web of bias-cut calendered fabric that is suitable for use in the building up of a tire carcass.

While bias-cutting machines are generally available for performing the aforesaid operations on conventional rubber coated tire fabrics such machines are generally not suited for use in bias cutting the metal reinforced tire material required for the breaker of radial-ply tires. Prior to being bias cut, the flexible breaker material is manufactured as a continuous web or strip of rubber having embedded therein parallely arranged metallic cords running in the longitudinal direction thereof. This continuous band of rubber and steel must now be cut transversely into rhombic-shaped strips by a bias-cutting machine and the cut strips must then be spliced or joined together in endwise relationship to form a second continuous band of bias-cut material that is suitable for use in building the breaker of a radial-ply tire.

In order to achieve wide acceptance in the industry an automatic bias-cutting machine must be capable of turning out uniform bias-cut strips at a high rate of production. Additionally, provisions must be incorporated into the machine for simply and accurately changing both the width of the bias-cut strips, and the bias angle at which they are cut, without requiring extended delays occasioned by shutting down of the machine for these purposes. This is necessary in order for the inherently expensive machines to be flexible enough to be used in the manufacture of various sized tires.

Previous attempts to develop automatic bias-cutting machines for cutting steel strand-reinforced rubber breaker materials have not successfully provided all of the foregoing features. In some cases uniformity of the end product has been lacking due to the machines not being able to uniformly cut successive strips with the result that such cut strips varied in width; a result which could not be tolerated. In other cases, excessive wear of the cutting blades was encountered, resulting in high maintenance costs and excessive down time. Furthermore, most prior machines required a cutting means having, after each cutting stroke, a time consuming return stroke. This prevented high production since the next step in the process, namely, the step of feeding the material preparatory to the next cutting stroke, could not generally bias-cutting until completion of the cutter return stroke.

Accordingly, it is one object of this invention to provide an improved bias cutting machine for metal-reinforced tire breaker material.

Another object of this invention is to provide a machine having a higher rate of production than presently available.

An additional object of this invention is to provide a machine which will accurately control the final width of bias-cut strips thus assuring their uniformity.

Another object of this invention is to provide an automatic bias-cutting machine having a cutter with a long useful life and relatively low maintenance requirements.

A still further object of this invention is to provide an automatic bias-cutting machine where width of the bias-cut strips may be readily varied and where successive strips of different widths may be produced, if desired.

A concomitant object of the invention is to provide an automatic bias-cutting machine wherein the bias angle at which the material is cut may be readily and accurately varied.

Further objects and advantages of this invention will become apparent as the following description proceeds.

Briefly stated, in accordance with one embodiment of this invention, material cutting means are pivotally supported with respect to material feeding means which latter is arranged to intermittently advance predetermined lengths of the material past the cutting axis of the cutter means. The cutter reciprocates along the cutting axis to repeatedly cut the continuous band of material into a series of bias-cut strips. The cutting axis is located downstream of the end extremity of the feed means. The material is cut in alternating sequence with the action of the feed means, both on the forward and on the reverse stroke of the cutter means.

According to another embodiment of the invention, the angle of inclination of the downstream end extremity of the feed means and of the cutting axis may be varied simultaneously in response to a single command so that a parallel relationship between the cutting axis and the end extremity of the feed means is maintained.

According to the preferred embodiment of the present invention the intermittent feed distance is automatically varied preparatory to each cut in a forwardly direction and preparatory to each cut in a rearwardly direction, as will be more fully described below. Thus, even where it is desired to cut successive strips of uniform width the material is advanced alternately longer and shorter distances between cuts. The difference in feed distance is chosen such as to compensate for dimensional distortion, e.g., width variation, of consecutive bias-cut strips, which would ordinarily be the result of consecutively cutting alternately in forwardly and rearwardly direction, with respect to the material feed direction, particularly with the low bias angles contemplated herein.

While the specification concludes with claims particularly pointing out and distinctly claiming the subject matter of this invention, it is believed that the invention will be better understood from the following description taken in connection with the accompanying drawings in which:

FIG. 1 is a diagrammatic plan view of a machine constructed in accordance with the present invention;

FIG. 2A is an enlarged partial view of the bias-cut strips as seen in FIG. 2;

FIG. 3 is an elevational view of the material feeding means of the machine shown in FIG. 1;

FIG. 4 is an elevational schematic view showing the conveyor belt configuration of the feeding means shown in FIG. 3;

FIG. 5 is a partial plan view of the conveyor belt arrangement of FIG. 4;

FIG. 7 is a diagrammatic illustration of a signal generator for measuring the amount of advance of the material;

FIG. 10 is a plan view of a portion of the downstream end of the conveyor of FIG. 3, enlarged, and showing two bias-angle positions of the end extremity thereof;

FIG. 11 is a partial sectional view taken along line XI-XI of FIG. 10, showing the guide roller means slidably supporting individual conveyor belt support beams;

FIG. 12 is an enlarged plan view showing the downstream end configuration of one of the conveyor elements shown in FIG. 10;

FIG. 13 is a front elevational partly sectional view of the conveyor end portion shown in FIG. 12;

FIG. 14 is an enlarged front elevational view of a portion of a conveyor belt support beam seen in FIG. 11, showing the upper and lower conveyor runs and guide roller arrangement for supporting the lower run;

FIG. 15 is a partial sectional view, taken along line XV—XV of FIG. 14;

FIG. 16 is a partial sectional view taken along line XVI—XVI of FIG. 14;

FIG. 17 is an enlarged plan view of a portion of the bias angle adjustment mechanism for adjusting the angle of inclination of the cutter means with respect to the feed means seen in FIG. 1;

FIG. 18 is an enlarged sectional view taken along line XVIII—XVIII of FIG. 17 showing the motion transmitting arrangement of the bias-angle adjustment mechanism of FIG. 17;

FIG. 19 is an enlarged sectional view taken along line XIX—XIX of FIG. 17;

FIG. 20 is an enlarged sectional view taken along line XX—XX of FIG. 17;

FIG. 21 is an enlarged sectional view taken along line XXI—XXI of FIG. 18;

FIG. 22 is an elevational view taken along line XXII—XXII of FIG. 1, showing the cutter table assembly together with its presser means;

FIG. 23 is a sectional view taken along XXIII—XXIII of FIG. 22;

FIG. 24 is an enlarged sectional view of the power transmission rail for the cutter carriage means of FIG. 23;

FIG. 25 is an enlarged elevational view of the cutter carriage and table assembly shown in FIG. 22, particularly illustrating the cutter carriage drive mechanism;

FIG. 26 is a cross-sectional view taken along line XXVI—XXVI of FIG. 25 showing, at an enlarged scale, the cutter carriage of FIG. 23;

FIG. 27 is an enlarged end elevational, partly sectional, view of a portion of the cutter carriage of FIG. 26 showing the position of the presser means in relation to the cutter blades;

FIG. 28 is a perspective view of the cutter carriage means;

FIG. 29 is a partial, sectional, view taken along line XXIX—XXIX of FIG. 18;

FIG. 30 is a sectional view taken along line XXX—XXX of FIG. 29;

FIG. 31 is a perspective, partly sectional view of a portion of the presser means shown in FIGS. 22 and 27;

FIG. 32 is an end elevational view of a portion of the presser means taken along line XXXII—XXXII in the direction of the arrows of FIG. 22;

FIG. 33 is a partial sectional view taken along line XXXIII—XXXIII of FIG. 32;

Figure 6:
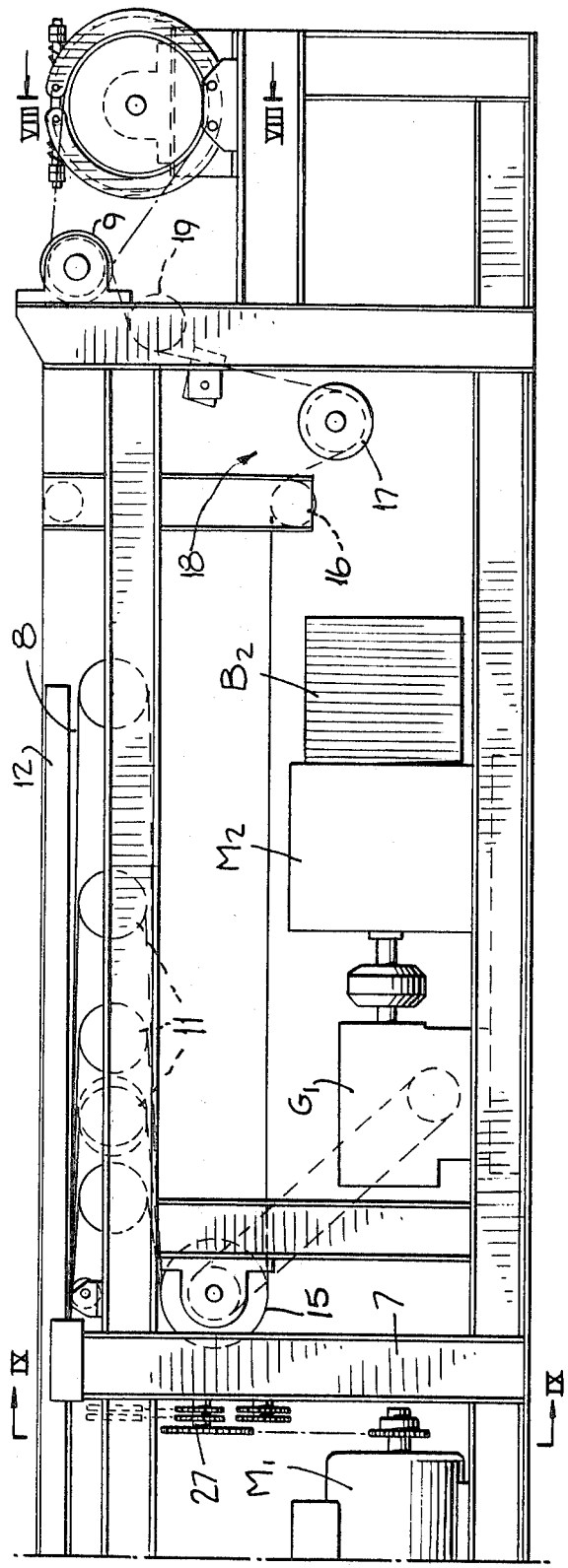
FIG. 6 is an enlarged elevational view of the upstream portion of the conveyor arrangement as seen in FIG. 3.

Referring now to the drawings, and in particular to FIG. 1, the machine includes a feeding means in the form of a conveyor assembly 1 which conveys the material 6 longitudinally thereof substantially in a horizontal plane past the cutting axis of angularly disposed cutter means 2. The latter includes a cutter carriage means 3 reciprocally mounted on a support in the form of support table 4. The cutter carriage support 4 is pivotally mounted for angular movement, with respect to the conveyor assembly 1 about a vertical pivot axis 5 of a pivot pin 5' suitably fixed to frame 7 of conveyor assembly 1 whereby the angle of cut may be varied. The cutter carriage means 3 is adapted to reciprocate along the carriage support 4 to intermittently cut predetermined lengths of material 6 into bias cut, rhombic sections, 6a, 6b, etc. (FIG. 2).

Figure 2:
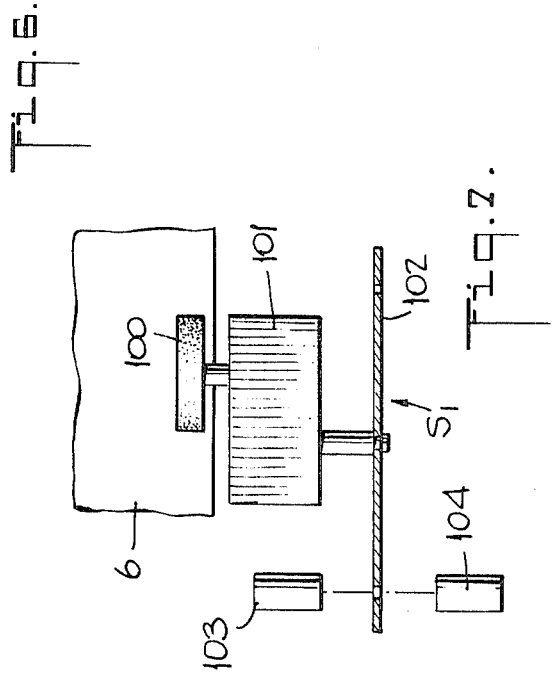
FIG. 2 is a perspective partial view of the continuous band of material and strips bias cut therefrom in accordance with the present invention.

As seen in FIG. 2 the tire breaker material 6, commonly in the form of a continuous band of rubber or similar elastomeric material having longitudinally extending reinforcing elements 6' embedded therein, is cut by the alternately forwardly and rearwardly directed cutting strokes of cutter carriage means 3 in the directions indicated by arrows a, b, and c, respectively. Thus, the leading edges of strips 6a, and 6b are cut in opposite directions; the leading edge of strip 6a being cut in "rearwardly" direction while the leading edge of strip 6b is cut in "forwardly" direction, with respect to the direction of feed of feeding means 1, i.e., with respect to the direction of arrow "A" of FIG. 1. As shown in FIG. 2 the feeding means 1 intermittently advances the material 6, longitudinally thereof, by distances $X_{a'}$ and $X_{b'}$ preparatory, respectively, to the forwardly (arrow b) and rearwardly (arrow c) directed cutting strokes of cutter carriage means 3. Assuming that it be desired to cut successive strips having widths of $X_a$, $X_b$ respectively, and at a bias angle $\alpha$, then with the cutting axis disposed at an angle $\alpha$ to the longitudinal axis of the feeding means 1, the width of the bias-cut strips $W_a$, $W_b$, etc., as measured in the direction of feed, namely in the direction of arrow A, becomes $$W_b = \frac{X_b}{\sin \alpha} \text{ and } W_a = \frac{X_a}{\sin \alpha}.$$ For the sake of brevity the term "width" as used hereinbelow with reference to the cut strips shall refer to the widths $W_a$, $W_b$, etc., i.e., as measured in the longitudinal direction of the material 6, rather than the width $X_a$, $X_b$, measured along a line perpendicular to the leading and trailing edges of the strips, unless otherwise specified to the contrary.

It will be obvious that since the longitudinally extending reinforcing elements, or cords 6', are commonly, in tire breaker material, in the form of steel wire cords, they provide a substantially different resistance to cutting than the intermediate rubber, or other elastomer. A pulling resulting in fabric distortion is therefore frequently encountered, particularly when cutting at relatively low bias angles. Furthermore, we have found this distortion to be different depending on the direction in which the cut is made.

The feeding means 1 includes a plurality of parallely arranged, longitudinally extending, conveyor means, preferably in the form of endless belts 8 whose upper runs, (FIG. 5), form a horizontal material support and feeding surface. Each of the belts 8 is trained around a common roller 9, at the upstream end of the feeding means, and around individual rollers 10a, 10b, 10c, 10a', 10b' and 10c' located at the downstream end. The rollers 10a, 10b, 10c, are located at one side of the longitudinal axis of the feeding means 1 while the rollers 10a', 10b', 10c' are located on the opposite side of the longitudinal axis. The lower runs of each of the conveyor belts 8, in returning from the rollers 10 to the upstream end of the conveyor assembly, are there trained around individual rollers 11a, 11b, 11c, 11a', 11b', 11c', respectively. Each of the latter rollers is rotatably carried by the upstream end portion of a corresponding longitudinally extending belt supporting beam 12 which may be more clearly seen in FIG. 9. The details of each of the belts 8, rollers 10a, 10b, etc. and beams 12 are identical so that only one such assembly will be described herein.

Each of the upper runs of the belts 8 is flatly supported on the horizontal upper surface of the corresponding one of the plurality of parallely arranged, longitudinally extending, belt support beams 12, each of which, in turn, is supported for independent longitudinal sliding movement on vertical edge rollers 13, which, in turn, are rotatably mounted on frame 7 (FIG. 11). Each of the beams 12 is preferably provided at its downstream end with a plurality of horizontal, parallely arranged, transversely extending rollers 14, decreasing in length in downstream direction. The rollers 14 provide added support to the leading portion of material 6 after the latter has moved past the end rollers 10. The path of the endless belts 8 is as follows:

The upper run of each of the belts 8 is supported horizontally by the respective longitudinal beam 12, intermediate the common upstream drum 9 and the corresponding downstream roller 10, respectively. At the downstream end each of the belts 8 is trained around the corresponding roller 10, namely 10a, 10b, etc. The return path of the lower run of each belt 8 extends rearwardly underneath the corresponding beam 12, to a corresponding roller 11 rotatably fixed to each beam 12 at the upstream end thereof. The lower run of each of the belts 8 is trained around the corresponding roller 11 (FIG. 10) so that the path thereof once more proceeds in downstream direction toward the common driving drum 15. All of the conveyor belts 8, after being trained around drum 15 follow a rearwardly path once more, over drum 16, seen in FIG. 6, and thereafter under drum 17 of a suitable belt-tensioning device, generally indicated at 18. From thence the path is upwardly over guide drum 19, back to the upstream drum 9. Drums 16, 17, 19 and 9, it will be seen, are common to all of the belts 8.

Tensioning device 18, for tensioning all of the belts 8 simultaneously, comprises a central horizontal drum 17 about which all of the belts 8 are trained. Drum 17 is rotatably supported on a horizontal shaft 17' which in turn is adapted to move in upwardly or downwardly direction as, for example in opposition to or under the influence of, respectively, the weight of drum 17 itself. Thus the weight of drum 17 urges the latter downwardly to simultaneously apply tension to all of the belts 8 in proportion to the pull exerted by such weight.

A conveyor roller 11 is fixed to the upstream end of each of the beams 12 by way of suitable brackets 20 which have upper portions fixedly connected to the beam 12 and lower portions rotatably supporting the corresponding roller 11. A parallely extending, elongated, externally threaded member 21 is located beneath each of the beams 12, and is suitably nonrotatably fixed at its upstream end to the corresponding bracket 20.

Referring now to FIGS. 14, 15 and 16, it will be seen that each of the beams 12 is provided near its downstream end with a pair of belt guide assemblies 80 which maintain the lower runs of belts 8 in proper position during operation. Each of the assemblies 80 comprises a depending bracket 81 suitably fixedly connected to the respective beam 12 at one side thereof and having a pair of horizontally spaced shafts 82 extending below the respective beam 12 and a group of rollers 83 rotatably supported on shafts 82 and supporting with their peripheral surfaces the lower run of the respective belt 8. Each of the brackets 81 also supports a plurality of belt-edge guide rollers 84 positioned substantially in the plane of the lower run of the respective belt 8, so as to maintain said belt in alignment with the respective beam 12.

Conveyor End-extremity Adjustment

Each of the longitudinally extending, externally threaded members 21 is nonrotatably supported and extends through and is in mesh with an internally threaded sleeve 22 which, in turn, is rotatably supported in a bearing 23 suitably fixed to frame 7. A sprocket 24 is keyed to each sleeve 22 for rotation therewith. Thus, in response to rotation of the corresponding sprocket 24, sleeve 22 will rotate within bearings 23 resulting, in view of the threaded engagement between rotatable sleeve 22 and nonrotatable member 21, in longitudinal displacement of the member 21 with respect to frame 7. This longitudinal displacement of members 21 results, as seen in FIG. 10, in a corresponding longitudinal displacement of the corresponding beam 12 and the rollers 10 and 11 fixed to opposite ends thereof.

Alternate ones of the members 21 have oppositely directed externally threaded portions. Thus, member 21a, for example, has a left-hand external thread while member 21b has a right-hand thread.

Figure 8:
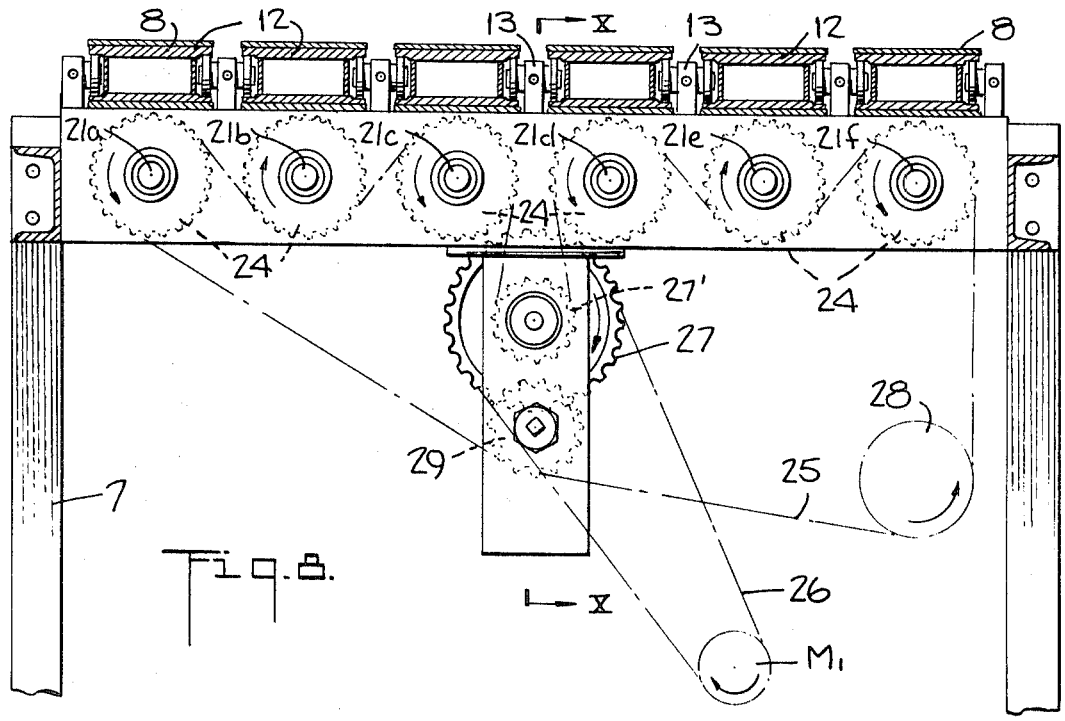
FIG. 8 is a sectional view taken along line IX-IX of FIG. 6, showing details of the bias angle adjusting mechanism for adjusting the angle of inclination of the conveyor end extremity shown in FIG. 10.

As seen in FIG. 8, an endless chain 25 is trained around all of the sprockets 24 in a manner to rotate adjacent ones of the latter in opposite directions, with the exception of the two centermost sprockets 24 which are rotated in the same direction. The arrows (FIG. 9) indicate the direction of rotation of the sprockets 24, when it is desired to increase the bias angle from the low-angle end position shown in solid lines in FIG. 1. A chain drive means including the chain 25, thus forms part of a bias-angle adjustment means which includes also the angle adjustment motor M1. This motor M1 is connected by a suitable drive means, which may take the form of a drive chain 26, to sprocket 27, rotatably supported on frame 7. Sprocket 27 has a second coaxial sprocket 27' suitably fixed to one side thereof and the latter has trained thereabout a portion of drive chain 25 intermediate the centermost sprockets 24, to thereby drive the latter, together with the remaining sprockets 24, whenever motor M1 is actuated. Drive chain 25 is trained also around an idler sprocket 27 and around a sprocket 28, the function of which will be described in greater detail below.

Figure 9:
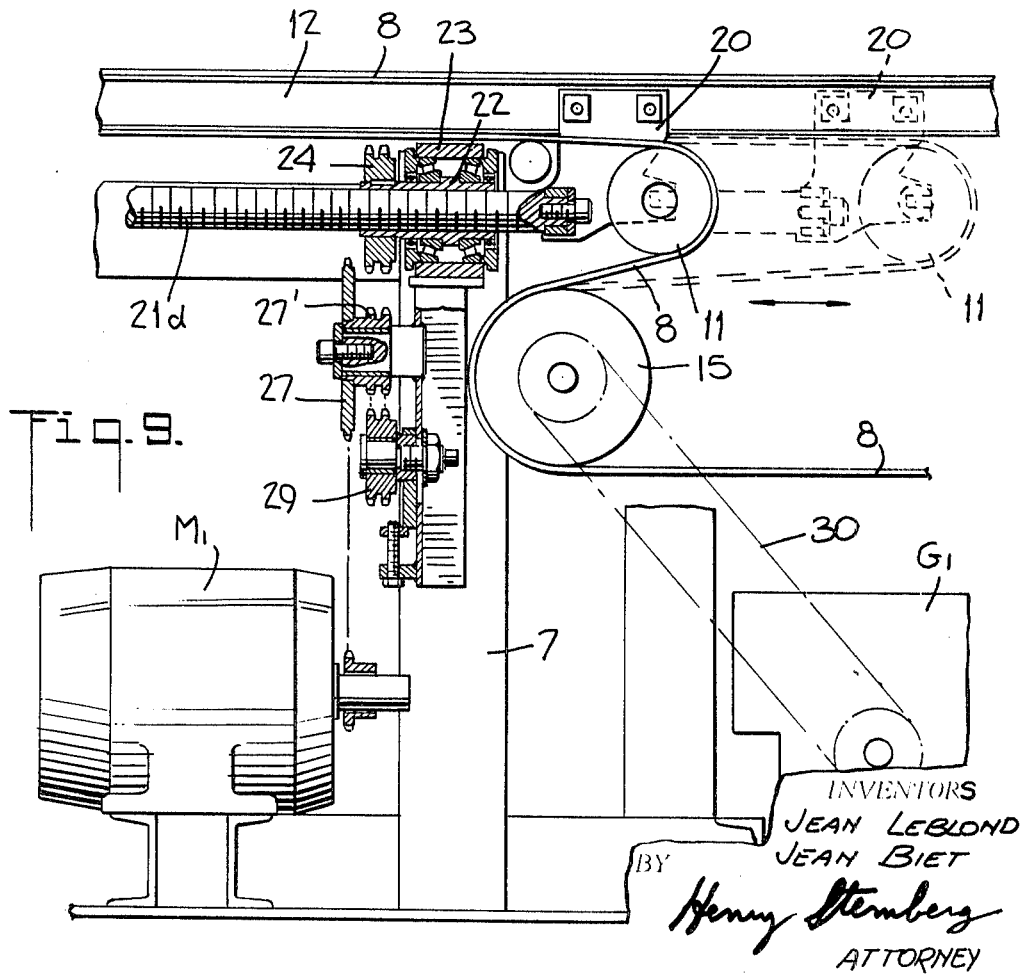
FIG. 9 is a sectional view, taken along the line X-X of FIG. 8 showing details of the drive for the conveyor angle adjusting mechanism of FIG. 8.

FIGS. 8 and 9, thus show the drive means for longitudinally displacing the individual beam members 12 to thereby vary the angle of the conveyor means end extremity represented by line $e$ seen in FIG. 10. As used herein the term "end-extremity" of the conveyor means shall refer to the line defined by those points, herein denoted $b$, of a horizontal axial section taken through the rollers 10, which points are closest to the cutting axis of cutter means 2. By moving the rollers $10a$, $10b$ and $10c$ in predetermined relationship with each other in upstream direction while simultaneously moving the rollers $10a'$, $10b'$ and $10c'$, in similar predetermined relationship, in downstream direction, the angle of inclination of the end extremity $e$ of the conveyor means may be adjusted, as seen in FIG. 10, between the end position shown by the chain line $e$ and the chain line $e$, respectively. The drive means for accomplishing this angle adjustment of the conveyor end extremity $e$ comprises, as noted above, the drive motor M1 operatively connected by suitable chain drive to a sprocket gear 27 fixed rotatably to frame 7. A second sprocket 27' fixed to sprocket 27 is suitably connected by the drive chain 25 to each of the individual sprockets 24, as well as to an idler sprocket 29, and to an additional sprocket 28 whose function will be described in greater detail below. Motor M1 is reversible so that the angle adjustment of the end extremity may be accomplished in either clockwise or counterclockwise direction about the pivot axis 5.

Conveyor Belt Drive

The drive means for driving the individual belts 8 for advancing the material 6 in downstream direction comprises a drive motor M2 (FIG. 6) which, through a suitable gear box G1, is connected by means of a suitable drive chain 30 to the drum 15 about which each of the individual belts 8 is trained.

Angle Adjustment of Cutting Axis

In accordance with the present invention the bias-angle adjustment means comprises, in addition to the above-described conveyor end-extremity adjustment means (FIGS. 8 and 9), the cutter table adjustment means shown in FIGS. 17, 18 and 21 for pivoting the cutter table 4 about the vertical axis 5 of pivot means 5'. A bracket 3 is fixedly connected to the cutter support table 4 and has a horizontal portion extending from one edge of the support 4 in the region of conveyor or means 1, provided with an elongated slot 31' which extends parallely to the axis of the support table 4. A second bracket 32 is fixedly connected to the adjacent edge of conveyor support frame 7 and has a portion which extends horizontally beneath the horizontal portion of bracket 31 and which is provided with an elongated, longitudinally extending, slot 32' in partial overlapping relationship with the slot 31'. A bar-shaped member 33 (FIG. 19), having an edge guiding surface, is provided intermediate said horizontal portions of members 31 and 32 and fixed to the frame 7 parallel to the longitudinal axis thereof. The height of member 33 is such that the bracket 31 will slide thereon during bias-angle adjustment. A bearing assembly 34 is received in the overlapping portions of slots 31' and 32' and comprises a vertical shaft 34', which supports a stack of horizontally disposed rotary bearings, namely, bearings $35a$, $35b$, and $35c$ whose outer races guide against the walls of slots 31', 32' and the edge of member 33, respectively (FIG. 21). A motion transmitting means in the form of a rod 36 is supported on frame 7 for longitudinal displacement and has a forked forward end suitably supporting vertical shaft 34' (FIG. 18) and displacing the same longitudinally in response to movement of rod 36. Fixedly connected to the rear of rod 36 and extending longitudinally rearwardly thereof is an elongated, externally threaded, member 37. As shown in FIG. 18, member 37 is coaxial with, and pinned to, rod 36 to prevent relative rotation therebetween. The outer housing of a bearing member 38 is suitably fixed to frame 7. The bearing has an inner race 38' which is internally threaded to mesh with externally threaded member 37 coaxially received therein. Inner race 38' has a portion which extends axially outwardly and which has keyed to it the sprocket 28 which, it will be recalled, forms part of the chain drive for adjustment of the bias angle (FIG. 8). It will be obvious that rod 36 moves longitudinally parallel to the axis of feed means 1, in response to rotation of sprocket 28. As shown, rod 36 has a square cross section (FIG. 20) and is slidably received in the square central opening of sleeve 39 which, in turn, is suitably fixed to frame 7. Sleeve 39 prevents rotation of rod 36 about its own axis thereby assuring smooth operation of the bearing assembly 34 in the slots 31' and 32'. The very same drive means, therefore, namely motor M1 and its drive connection, which varies the angle of inclination of the end extremity of conveyor means 1, simultaneously varies the angle of inclination of the cutter support table 4. Table 4 is provided, substantially centrally thereof, with an extension 39a which forms part of pivot means 5' pivotally engaging the pivot pin which latter is fixedly connected to the frame 7 by any suitable means. Fixed stationary horizontal surfaces, in the form of plates 40a, 40b and 40c, (FIG. 22), slidably support three spaced base portions 41a, 41b and 41c, respectively, of table 4. The base portions are suitably fixed to the lower portions of support table 4 and are slidable on the upper surfaces of the respective plates 40a, 40b, and 40c, so that the cutter support table may be pivoted about the vertical axis of pivot means 5'. Thus longitudinal movement of rod 36, which has an end portion 34 partially located in the slot 31', results in a scissorlike displacement of the movable bracket 31 with respect to the fixed bracket 32. It will be obvious that this displacement is possible only as a result of cutter means 2 pivoting with respect to feed means 1 about the vertical pivot axis 5.

An arcuate scale 200 (FIG. 1) is suitably connected to one end of cutter support table 4 while a fixed pointer 201 is suitably connected to the conveyor support table 7 and cooperates with the markings on scale 200 to indicate the inclination of the cutting axis with respect to the longitudinal axis of the feed means 1. Scale 200 is preferably provided with graduations ranging from an angle of inclination of 12° to an angle of inclination of 30° between the cutting axis and the longitudinal axis of the feed means 1.

It is preferred to locate the vertical pivot axis 5 along the end extremity of the conveyor means 1 to obtain parallelism between the aforesaid end extremity of the conveyor means and the cutting axis. The preferred location of axis 5 along line e is the point of intersection of lines e and e', representing, respectively, the end-extremity line at the end positions of angular displacement of cutter means 2.

Cutter Carriage

Cutter carriage means 3 comprises four sets of mutually inclined rollers 42 adapted to roll on a pair of parallel guide rails 43 suitably fixed to the cutter support table 4 and extending axially parallel thereto, as seen in FIG. 26. Thus, cutter carriage 3 is movable to and fro axially of table 4 along the guide rails 43. Additional rollers mounted on the underside of carriage 3 by suitable brackets may be provided for added stability. Thus, rollers 44 may be provided to guide against the bottom edge of a corresponding bar 44' suitably fixed to rails 43 as shown. The drive means for reciprocating the cutter carriage means 3 axially along the table 4, includes a reversible electric drive motor M3 suitably mounted on one end of the cutter table 4 and suitably connected to a speed reducer G2, in a manner well known in the art (FIG. 25). According to one embodiment of the present invention a sprocket 45a is connected to the output shaft of speed reducer G2. A suitable chain 46a is trained around sprocket 45a and also around sprocket 45a', rotatably mounted at the opposite end of the support table 4, and has opposite ends thereof connected to opposite sides of the cutter carriage means 3, as seen in FIG. 25. Motor M3 is, of course, reversible so that the direction of movement of the cutter carriage 3 may be reversed at the end of each cutting stroke, resulting in the aforesaid reciprocatory movement of cutter carriage 3.

The reciprocable cutter carriage 3 supports a pair of circular disc slitters 45 and 46, respectively mounted on vertically spaced, parallel, horizontal shafts 47 and 48, and rotated in opposite directions by the cutter blade drive motor M4 which is supported on carriage 3 and is connected by a suitable belt 49 to pulley 49a which in turn is fixed to the upper shaft 48. A pair of meshing gears 50 and 50a are fixed, respectively, to the shafts 47 and 48 to assure the simultaneous and opposite rotation of the shaft 47 in response to rotation of shaft 48 by belt 49. As seen in FIG. 26, shafts 47 and 48 are located in and extend through the legs of a U-shaped housing 51, with the cutter blades 45 and 46 located at the free ends of the U and the above-described drive means, for driving the cutter shafts, located at the closed end of the U-shaped housing.

A material-supporting surface, which may be in the form of a flexible sheet metal member 52 extends horizontally substantially the length of support table 4 at a height intermediate the vertically spaced, horizontal legs of the U-shaped cutter housing 51, as seen in FIG. 26. A conventional stretching means 53, which may be in the form of suitable threadedly engaging members respectively connected to an end of the sheet member 52 and bearing against the support 4, permit any desired degree of stress to be applied to the sheet member 52 lengthwise thereof, so as to maintain the latter in relatively flat, stretched condition along its entire length.

The pair of disc slitters, or blades, 45 and 46 overlap slightly, as best seen in FIG. 27, with portions of a flat side face of one slightly overlapping portions of the adjacent flat side face of the other to allow the cutting discs to make a clean cut of the material 6 therebetween. As seen in FIG. 26, the leading edge of the material support surface of member 52 is at a slightly lower elevation than, and downstream of, the cutting axis of blades 45 and 46. The height relationship between the cutting blades and the sheet member 52 is maintained throughout the entire cutting stroke, which may be of considerable length, in the manner now to be described.

The housing 51 is fixedly mounted on undercarriage 51a of cutter carriage means 3 which, in turn, is supported by the rollers 42, as previously described. A pair of guide rollers 54 (FIG. 28) are, respectively, rotatably connected to housing 51, on opposite sides of and parallel to the axis of lower cutter blade 45. The vertical position of rollers 54 is such that sheet member 52 rests on the peripheral surface of the rollers 54 during reciprocatory movement of the cutter carriage 3 along guide rails 43. Connected to the upper leg of the U-shaped housing 51, by any suitable means, is a biasing means 55 (FIG. 28). This biasing means comprises a transverse bracket 55' fixedly connected to the upper arm of housing 51 and having suspended therefrom a pair of coaxial horizontal shafts 56 and 57, respectively located at opposite sides of the upper arm of housing 51 and extending generally parallel to the cutting axis which, of course, is the line along which the blades 45 and 46 cut the material 6. Shafts 56 and 57, respectively, (FIGS. 29 and 30) carry sleeves 56' and 57' which latter have fixed thereto, at right angles, arms 56" and 57", respectively. Arms 56" and 57" are, therefore, rotatably mounted about a common axis, i.e., the axis of shafts 56 and 57. A pair of parallelly arranged pulleys 56''' and 57''', respectively, are rotatably mounted at the ends of arms 56" and 57" and have an endless belt 58 trained therearound in such manner that the lower run thereof is in engagement with the horizontal supporting surface of sheet member 52 just downstream of the cutting axis of blades 45 and 46, or with the portion of the material 6 which may have been advanced beyond such cutting axis. Pulleys 56''' and 57''' are supported on the respective shafts 56" and 57" by suitable bearings so as to be freely rotatable on the latter shafts. Thus, as the carriage 3 reciprocates along guide rails 43, the belt 58 in engagement with the surface of member 52 or the material 6 positioned thereon, is, so to speak, laid down by one of the pulleys and picked up by the other. Thus, while the belt 58 moves along the cutting axis there is no relative sliding movement, at any time, between the belt 58 and the member 52, or the material 6 positioned thereon. In other words, the belt 58 moves similarly to a caterpillar tread.

A resilient means which may be in the form of a U-shaped spring member 60, is connected at its opposite free ends to opposite depending portions of the bracket 55'. A collar 61 having a flat bottom portion is fixedly but angularly adjustably connected to shaft 56 by any suitable means with the flat bottom surface thereof resting on and in engagement with the spring 60 so that any upward movement of pulleys 56''' and 57''' about the axis of shafts 56, 57, in response to the belt 58 engaging the material 6, will be counteracted by the spring 60 which will urge the assembly 56''', 57''' and 58 to pivot about the axis of shafts 56 and 57 in a direction to urge the lower run of belt 58 toward the plate 52, thus having a clamping effect on the material 6 located therebetween. When the cutter carriage 3 reciprocates along the path defined by guides 43, the adjustment of member 61 will preferably be such that the lower run of belt 58 is in engagement with the surface of member 52. When, however, the leading portion of material 6 has been advanced to a position on the surface of member 52, the belt and pulley assembly (FIG. 28) will be rotated slightly by the material an amount approximately equal to the thickness of the material 6. This latter movement will be opposed by the action of the spring 60.

In order to ensure that electrical power to the cutter blade drive motor M4 (FIG. 28) is not interrupted during the traversing movement of cutter carriage 3, an electrical power trolley mechanism 90 is provided. One end of the power trolley mechanism 90 is supported from cutter table 4 by means of a bracket 90a while the other end of the power trolley mechanism 90 is similarly supported (not shown). Mounted within power trolley mechanism 90 (FIG. 24) are a plurality of elongated metallic electrical strips or conductors 91 which carry the three-phase power necessary to drive motor M4. The conductors 91 are contacted by movable contacts or shoes 93 which are resiliently biased thereagainst so that good electrical contact with conductors 91 is maintained during the cutting stroke. The shoes 93 are carried by an arm 94 which is rigidly fastened to the bottom plate of cutter carriage 3 and moves therewith. Thus, an electrical feed arrangement is provided which keeps motor M4 energized to drive the cutter blades 45 and 46 during the time that cutter carriage 3 is being traversed in its path on track or guides 43. Wires (not shown) interconnect the movable contacts 93 with motor M4 while the elongated electrical conductors 91 are conventionally energized from a three phase source (not shown). The power trolley mechanism 90 is preferably of the type known as a "-Feedrail," model No. 100, manufactured by the Feedrail Corporation of New York City, N.Y.

Presser Assembly

Figure 34:
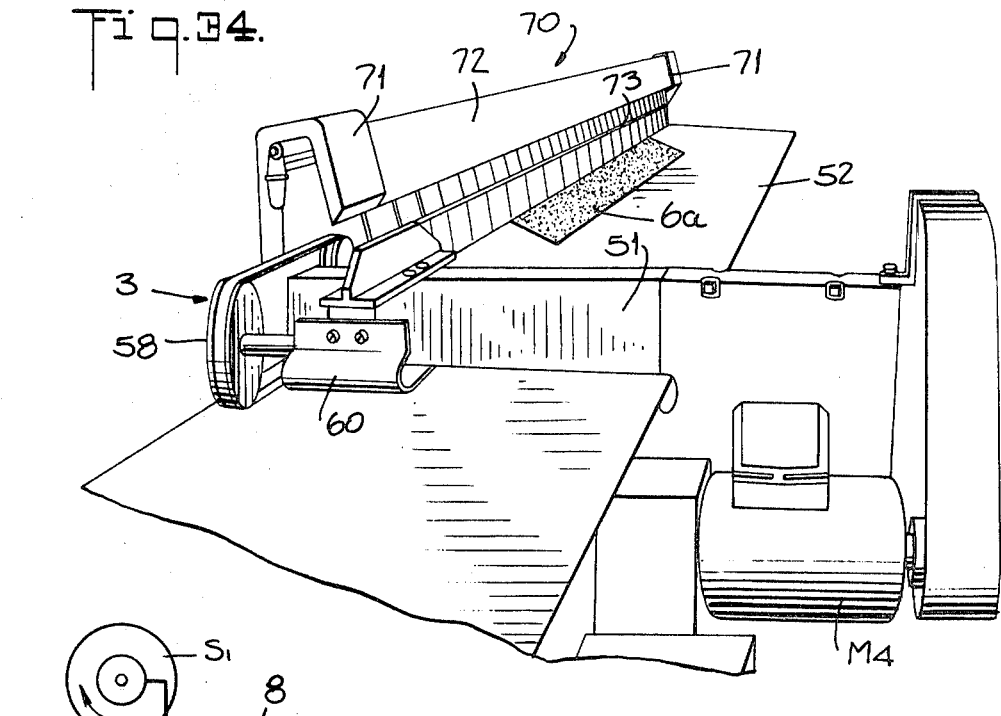
FIG. 34 is a perspective view of the cutter carriage and presser means shown in FIG. 22.

Fixed to that side of the cutter support table 4 which is closest to the conveyor means 1, is a presser means 70 (FIGS. 27, 31 and 34) which comprises a pair of spaced substantially vertical brackets 71 fixedly connected in the lower regions thereof to the cutter support table 4, at opposite sides, respectively, of conveyor means 1. An elongated tubular member 72 extends horizontally between and is suitably fixed to the upper portions of brackets 71 so as to extend parallely to the axis of the cutter support table 4 and, thus, parallely to the cutting axis thereof. The bottom wall of horizontal tubular member 72 is provided with a series of rectangular openings spaced along the length thereof. A plurality of upright, slightly inclined presser plates 73, provided at their lower ends with grooved rubber feet 73' for engaging the material 6, extends through the respective spaced openings. The plates 73 are rigidly connected at their upper ends to a common second tubular member 74, which is positioned within the tubular member 72 substantially coextensive therewith and displaceable upwardly and downwardly therein. To facilitate the upward and downward movement of the individual presser plates 73 in response to similar movement of the common tubular member 74, there are provided a plurality of sleevelike guide members 75. These guide members are received in the lower openings of member 72 and, in turn, slidingly receive the respective presser plates 73. An inflatable flexible elongated tubular member 76 is located in the interior of tubular member 72 and is substantially coextensive therewith intermediate the upper wall thereof and the upper wall of movable inner member 74. As seen in FIGS. 32 and 33, compressed air inlet and outlet means in the form of a conventional pneumatic connector 77 may be provided in an end wall of tubular member 72, to permit the introduction and removal of compressed air, at will, into the interior of the inflatable tube 76. The compressed air supply and valves to accomplish the stated purpose are conventional and therefore require no further description. When compressed air is admitted into the interior of tube 76 the walls of the latter expand outwardly causing the movable member 74 to move downwardly in pistonlike manner in opposition to the bias of springs 78. This movement causes the individual presser plates 73 also to move downwardly toward the upper surface of a horizontally extending flange 79, which latter is fixedly connected to and extends between the brackets 71 intermediate the cutting axis and the end extremity of the conveyor means. The horizontal upper surface portion of flange 79 has a leading edge, as seen in the direction of material advance, closely adjacent to the end extremity e of conveyor means 1 and has a trailing edge closely adjacent to the cutting axis of cutter blades 45 and 46 and at a height substantially at the middle of the overlap between the opposing cutting blades. The said surface of flange 79 is also substantially at the same height as the upper surface of the conveyor means 1 so that material 6 fed by conveyor means 1 toward the cutter means will move beyond the end extremity of the conveyor means onto the said surface of flange 79, beneath the presser plates 73. Any further advance of the material 6 results in leading portions thereof gliding onto the support surface of sheet member 52.

It is the function of the presser means 70 to hold the fabric, i.e., material 6 securely in position during each cutting stroke of the cutter means. As seen in FIG. 27, the presser means 70 is slightly inclined with respect to the vertical, so as to permit the lower ends of presser plates 73 to come as close as possible to the cutting axis of cutter blades 45 and 46 without interfering with the reciprocating movement of cutter carriage 3. The lower pressing surface of the presser feet 73' is, however, preferably disposed horizontally so as to provide maximum pressing engagement with fabric.

Feeding the Material

As previously noted, the material 6 is a flexible sheet material which may consist, for example, of rubber having a plurality of elongated longitudinally extending reinforcing elements 6' in the form, for example, of steel strand, embedded therein.

The following will serve as an example of a type of material used for building a reinforcement breaker for passenger automobile tires, which may be cut by the bias cutter according to the present invention:

Basic material—Continuous sheet rubber
Material thickness—1.5 mm.
Material width—1 meter.
Material reinforcement steel wire cord (5 twisted wires—each wire having a diameter of 0.25 mm.)
Reinforcement position—Longitudinal cords (density)—714 strands/meter
Width of strip to be cut (breaker)—90 mm.

In operation, preparatory to each forwardly directed cutting stroke (arrow b FIG. 2) the feed means 1 advances the material 6 a distance $X_{a'}$, while, preparatory to each rearwardly directed cutting stroke of cutter means 2, feed means 1 advances the material 6 a distance $X_{b'}$.

When bias cutting at low angles such as contemplated herein, i.e., at angles of $a$ in the range of $12°-30°$, and particularly when the material is one containing longitudinally extending reinforcing elements such as cords 6' described above, we have found that cutting in forwardly direction produces a different distortion of the material, than cutting in the rearwardly direction. It should be noted, in this connection, that while strip 6a has both its leading and trailing edges cut against the "grain" so to speak, of material 6, considering reinforcing element 6' as representing the "grain" of the material, the next succeeding strip, strip 6b, has both its leading and trailing edges cut with the "grain" so to speak, of material 6, and so on in alternating sequence for all succeeding strips which are cut. The fact is, that the material 6 is distorted to a different extent depending on the direction in which it is cut. This distortion may result from a greater pull on the upstream material, i.e. the portion clamped by presser means 70, during the forwardly directed cuts (arrow b) than during the rearwardly directed cuts (arrow c), as well as a distortion of the ends of the cut strands 6' along the leading and trailing edges of the respective strips.

As may be seen in FIG. 2a, the rearwardly directed cutting stroke (arrow a), going with the "grain," so to speak, with respect to the material of the leading strip bends substantial portions of the trailing ends of the reinforcements 6' of the leading strip, while at the same time more sharply bending shorter portions of the leading ends of the reinforcements 6' of the leading edge of the next succeeding strip, strip 6a. The latter being cut, so to speak, against the "grain" of the material of strip 6a.

We have found, as will be more clearly described hereinbelow, that where, for example, consecutive strips of equal ultimate width ($W_a = W_b$), are desired to be cut, with alternating forwardly and rearwardly directed cutting strokes, at a low-bias angle, from material or fabric 6 such as described herein, the feed means must advance the fabric different distances preparatory to each forwardly as distinguished from each rearwardly directed cutting stroke. Thus, where strips of equal ultimate width are desired, the consecutive distances by which the material must be advanced must be different. In other words $X_{a'}$ will, according to the present invention, not equal $X_{b'}$ (FIG. 2) where strips of equal ultimate width are desired.

Similarly, where consecutive strips of different ultimate widths $W_{a'}$ and $W_{b'}$, respectively, are desired to be bias cut, we have found that the fabric advance distance $X_{a'}$ for a given ultimate strip width $W_{a'}$, whose leading edge is cut by a rearwardly directed stroke (arrow a) and whose trailing edge is cut by a forwardly directed stroke (arrow b), must be different than the amount of advance which would be required for cutting a strip of the same ultimate width with a forwardly directed stroke (arrow b) at the leading edge thereof and a rearwardly directed stroke (arrow c) at the trailing edge thereof.

Where, for example, it is desired to cut successive strips of equal ultimate width ($W_{a'} = W_{b'}$) then the amount of advance of the fabric 6, preparatory to being cut in said rearwardly direction, must be less than the amount of advance preparatory to being cut in said forwardly direction.

An example will serve to illustrate the foregoing more clearly. Using the fabric described in detail above, then, if at a bias angle $\alpha$ of 20° it is desired to obtain a strip 6b of true width $X_b$=90 mm., the amount of fabric advance preparatory to cutting in rearwardly direction (arrow c) should be approximately 260 mm., while in order to obtain a strip 6a of true width $X_a$=90 mm., the amount of fabric advance preparatory to cutting in forwardly direction (arrow b), should be approximately 267 mm. In other words, the advance for each strip 6a exceeds by 7 mm. the advance required for the next succeeding strip 6b if strips 6a and 6b are desired to be of equal ultimate width.

As a further example, let us assume a bias angle $\alpha$ of 16° and an ultimate true strip width $X_b$ of 90 mm. The amount $X_{b'}$, i.e., the amount of fabric advance preparatory to cutting strip 6b from the fabric in rearwardly direction (arrow c) should be approximately 324 mm., while the advance $X_{a'}$ i.e., the amount of fabric advance preparatory to cutting strip 6a from the fabric with a forwardly directed cutting stroke (arrow b) should be approximately 324 mm.

It will be obvious that the differential in consecutive amounts of advance of the material does not depend upon the strip width but rather, for a particular material, depends solely upon the bias angle. Thus, it will be seen that for consecutive strips of ultimate equal width, the amount of fabric advance preparatory to each forwardly directed cutting stroke of the cutter means must be greater than the amount of fabric advance preparatory to each rearwardly directed stroke. In order to achieve this differential in the amount of fabric advance preparatory to oppositely directed cutting strokes, control means 110 are provided. Control means 110 includes a fabric advance sensing means $S_1$, a pair of limit switches $LS_3$ and $LS_4$, which detect the presence of the cutter carriage means 3 near the opposite end positions thereof, a pair of resettable electronic counters $C_F$ and $C_R$, a two-speed electric feed motor M2, appropriate electric braking means for motor M2 and suitable circuit means including a switching means SW, connecting all of the latter.

Figure 35:
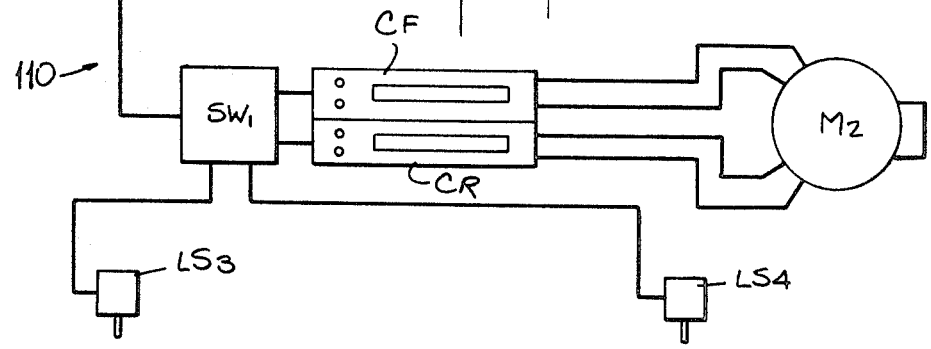
FIG. 35 illustrates diagrammatically the control circuit for controlling the feed of conveyor of FIG. 3.

The pulse generator S1 FIG. 7, for measuring the distance material 6 is advanced and generating a series of electrical pulses corresponding to such distance, is fixed by suitable means (not shown) to conveyor support frame 7 in the region of the upper reach of the conveyor means. A conventional signal generator may be used, as, for example, the "Drehimpulsegeber"—Type RON II No. R 239, 360 Impulses/revolution—manufactured by the Johannes Heidenhain Company, 8225 Traurrent, Germany. Alternatively, the signal generator S1 may be in the form of a photoelectric device, as illustrated in the drawings, having a roller 100 extending over and in contact with a portion of the upper surface of material 6 as the latter is advanced by conveyor means 1 (FIGS. 3 and 7) so as to rotate, without slip, in response to movement of the material. Roller 100 may be connected, in well-known manner, through a suitable speed-change gear mechanism 101, to a rotary disc 102 having a plurality of closely spaced circumferentially distributed openings. A photo cell 104 and a cooperating light source 103 are located, with respect to disc 102, so that in response to light from the light source impinging on the photocell each time one of the openings of disc 102 traverses the light path, the photocell provides an electrical pulse. A pair of conventional electronic counters, namely, counters $C_F$ and $C_R$ have their inputs sequentially connected by suitable circuitry to the output of the impulse generating unit $S_1$. The counters may be of the following type:

Type CPT 3 (double preselection) manufactured by the Elesta Company, France, with each having, as above noted, two preselection possibilities which may be manually controlled. Thus, two preselected quantities may be set into each counter. The counter provides a first output signal when the first preselected quantity is detected at the counter input, and provides a second output signal when the second preselected quantity is detected at the counter input. Thus, when the pulse producing generator S1 has produced a number of pulses equal to the first preselected number of, for example, counter $C_F$, the latter, which is connected by suitable circuitry to motor M2, provides a command reducing the speed of motor M2 and thus the speed at which the material 6 advances. When the impulses produced approach the second preselected number of counter CF, the latter provides a second command signal, this time to the braking mechanism of motor M2, to stop rotation of the motor completely and hence to prevent further advance of the material 6. While the two counters $C_F$ and $C_R$ are identical in all respects, the preselected values thereof may, and normally are, different. Both counters are resettable to zero and suitable switching circuitry is provided (FIG. 35) to reset one counter and switch to the other counter after each cutting stroke. The circuit is so arranged that counter $C_F$ controls the amount of material feed preparatory to each forwardly directed cutting stroke of the cutter carriage means while counter $C_R$ controls the amount of feed preparatory to each rearwardly directed cutting stroke of the cutter carriage.

A pair of limit switches $LS_3$ and $LS_4$ (FIG. 22) are located along the side of, and suitably connected to the support 4, with their actuating arms $LS_{3'}$ and $LS_{4'}$, respectively, located near the opposite ends of the path of movement of cutter carriage 3. A suitable circuit connects switch $LS_3$ to switching means $SW_1$ for switching the output of generator $S_1$ from counter $C_F$ to counter $C_R$ when $LS_{3'}$ is actuated by cutter carriage means 3 moving toward it forward end position. Switch $LS_3$ simultaneously resets counter $C_F$ to zero in readiness for its next cycle of operation. Similarly, when moving in the opposite direction, i.e., in rearwardly direction, cutter carriage means 3 actuates limit switch $LS_4$ to reset counter $C_R$ to zero and to switch the $S_1$ output once more to counter CF. A further pair of limit switches $LS_1$ and $LS_2$, having pivotable actuating arms, $LS_{1'}$ and $LS_{2'}$, respectively (FIG. 25), are also located along the side of the suitably connected to the cutter support table 4, beyond the switches $LS_3$ and $LS_4$ respectively. Limit switches $LS_1$ and $LS_2$ are spaced apart a distance substantially equal to the desired length of the cutting stroke of carriage 3, i.e., further than switches $LS_3$ and $LS_4$, and are suitably connected electrically to the carriage-traverse motor $M_3$ in a manner well known to those skilled in the art so as to first stop and then reverse the motor M3, preparatory to its next operating cycle, each time one of the aforesaid limit switches is actuated by element 96 striking the respective actuating arm $LS_{1'}$ or $LS_{2'}$.

Reference is made herein at times to subsidiary devices such as electrical relays, limit switches, electronic counters, solenoid valves, pulse generating devices, etc., all of which are conventional items of hardware and are, therefore, not all shown in the drawings. Furthermore, many of the actual wiring circuits embodying these various devices are not illustrated because, with the following explanation as to the functions performed by these circuits, the actual circuits will be readily evident to an electrician of ordinary skill, and full illustration of such circuits would only complicate the drawings.

As may be seen in FIG. 2, the material 6 is bias cut transversely with respect to the longitudinal direction of the elements 6', into successive strips a, 6b, 6a, 6b, etc. The angle at which the strips are bias cut is, as aforesaid, preferably in the range of 12° to 30°. This angle $\alpha$, it will be noted, represents the angle between the cutting axis and the longitudinal axis of the feed means 1 which latter is of course, parallel to the longitudinal axis of the material 6. The direction of feed of material 6 is indicated by the arrows A: (FIGS. 1 and 2).

The arrows a, b and c (FIG. 2) indicated, respectively, the direction of movement of cutter carriage 3 when making the respective cuts for bias cutting, from the material 6, the strips 6a and 6b. Thus, it will be seen that the leading edge of strip 6a is cut in rearwardly direction (with respect to the direction of feed of material 6), namely in the direction indicated by arrow a, while the trailing edge thereof is cut in forwardly direction, namely in the direction indicated by arrow b. Conversely, the next succeeding strip, namely strip 6b, has its leading edge cut in forwardly direction (arrow b) and its trailing edge cut in rearwardly direction (arrow c). Thus, successively cut strips have their leading and their trailing edges cut in alternate directions. The true widths of the successively cut strips 6a and 6b, respectively, are indicated by the reference numerals $X_a$ and $Y_a$, respectively, measured along lines perpendicular to the leading and trailing parallel edges of the respective strip. While an unlimited number of strips can be cut having, respectively, the characteristics of strips 6a and 6b, only three such strips are here illustrated for sake of clarity.

Each of the counters $C_F$ and $C_R$, respectively, preferably has a pair of preselection possibilities so that a pair of preselected numbers may be manually set into each counter with appropriate knobs provided for that purpose.

The feed sensing means $S_1$ is of a type which produces a series of electrical impulses whose number corresponds to the amount of fabric feed. Thus, for example, an electric impulse may be produced for each millimeter of fabric which moves past the sensing devices $S_1$. Electronic counters $C_F$ and $C_R$, respectively, each have a first and a second preselection possibility so that not only the final desired feed length for each strip 6a, severed in, for example, forwardly cutting direction from the remaining fabric, may be set therein, but a second number somewhat less that the first preset number may be set therein for the purpose of reducing the speed of conveyor means 1 and thus of the feed of the material 6, when approaching the first preselected number, but prior to reaching the same. In this manner the material advance may be very accurately controlled since, while for the major amount of each advance distance the means 1 advances the fabric at a rapid pace, when the amount of advance approaches its limiting value the appropriate counter switches motor M2 to low speed thereof so that the final portion of each fabric advance cycle is accomplished at slow speed. The final position of the material at the end of each advance cycle is, therefore, very accurately determined.

Figure 36:
FIG. 36 illustrates diagrammatically the control circuit for controlling the presser means shown in FIG. 31.

Assuming the cutter carriage means 3 to be moving in rearwardly cutting direction, then, upon completion of the cut, and after actuating limit switch $LS_4$ resulting in the switching described above, the arm 96 actuates limit switch $LS_2$. Limit switch $LS_2$, in turn, being in circuit with a control for motor M3 (FIG. 36) shuts off the latter motor so as to stop the movement of the cutter carriage means 3 and simultaneously reverses the motor winding connections in well-known manner so that the motor will rotate in opposite direction the next time it is energized. Thereupon, via suitable circuitry (not shown), the conveyor feed motor M2 is actuated for high-speed operation thereof. Motor M2, through suitable transmission means, including speed reduced $G_1$, drives the drum 15 in a manner to move the upper runs of belt 8 in the direction of arrow A (FIG. 1) for advancing fabric 6 in downstream direction. The advance of fabric 6 is, of course, detected by the sensing means $S_1$, which latter generates electronic pulses directly proportional in number to the distance the fabric is advanced. These pulses are fed through suitable circuitry to electronic counter $C_F$ which, when the amount of pulses corresponding to the first preselected number is reached, gives the command to motor M2 to shift to slow speed, thus slowing the fabric advance. The continued movement of the fabric, however, continues to be detected by sensing means $S_1$ so that when the second, i.e., larger number, preset in counter $C_F$ is reached, the latter, through suitable circuitry, energizes the electric brake of motor M2 to stop the same and therewith to stop the fabric advance at the precise amount of advance desired. Thereafter, switching means SW2, through suitable circuitry, energizes motor M3 for rotation in a direction opposite to that of its previous cycle of operation so as to move cutter carriage means 3 in forwardly direction along guides 43. Simultaneously with actuation of motor M3 to move cutter carriage means 3 in a forwardly direction, the cutter blade drive motor M4 is actuated through suitable circuitry for rotation in a direction opposite to that in which it had previously rotated cutter blades 45 and 46. In FIG. 29 the direction of cutter carriage means 3 is indicated by arrow B while the corresponding direction of rotation of the cutter blades is indicated by arrows d and d', respectively. Thus, when the direction of cutter carriage movement is reversed, the directions d, d' of the cutter blades is simultaneously reversed.

Upon completion of the forwardly directed cutting stroke and after having actuated limit switch $LS_3$, the arm 96 engages the finger $LS_{1'}$ of limit switch $LS_1$ so as to actuate the latter, repeating the entire cycle described above, only in reverse. Thus, switch $LS_1$ through suitable circuitry (not shown) stops the cutter carriage motor M3 so as to prevent further forward movement of the cutter carriage, while simultaneously actuating means to reverse the direction of carriage drive motor M3 and cutter drive motor M4 preparatory to the next cycle thereof. Feed motor M2 is thereafter energized through suitable circuitry (not shown) so as to once more begin advance of fabric 6 in downstream direction (arrow A). This advance continues until the lower of the two preselected numbers set into counter $C_R$ have been sensed by the sensing means $S_1$ and in turn transmitted to counter $C_R$ in the form of pulses. When the said lower number has been reached, motor M2, on instruction from counter $C_R$ is switched to slow speed. When counter $C_R$ reaches the higher of the preselected numbers, representing the total fabric advance desired preparatory to a rearwardly directed cutting stroke, the motor M2 is braked by a signal from counter $C_R$ to prevent further advance of the fabric, motor M3 is then once more energized and the cutter carriage means 3 proceeds with its rearwardly directed cutting stroke to once more sever, from the fabric, the portion thereof which was advanced beyond the cutting axis.

Limit switches $LS_1$ and $LS_2$ also, through suitable circuitry (not shown), control the pressing means 70. The latter are placed in pressing condition, pressing the material 6 between presser plates 73 and the support member 79, for the duration of each cutting stroke, and are placed in release condition, i.e., permitting material to move freely between plates 73 and support 79 upon completion of a cutting stroke and prior to the beginning of the next succeeding cutting stroke. Thus, whenever one of the switches $LS_1$ or $LS_2$ is actuated by approach of cutter carriage means 3, the former actuates a solenoid valve (not shown) which will permit air to flow out of the inflatable member 76 (FIG. 27) thus permitting the presser plates 73 to retract under the influence of springs 78. Upon completion of a fabric feed cycle and prior to actuation of motor M3 the above solenoid valve is closed while a second suitable solenoid valve (not shown) is actuated and supplies compressed air to the inflatable member 76 thus forcing the presser plates 73 toward support 79 to firmly grip the fabric therebetween, i.e., placing the presser means in pressing condition, so as to facilitate the cutting process.

A single drive means, which may be in the form of an electric motor M1 is operatively connected both to said cutter means 2 for pivoting the latter about axis 5, and to said conveyor means 1 for varying the angle of inclination of the end-extremity thereof. In order to vary the angle of inclination between the cutting axis and the longitudinal axis of feeding means 1, so as to vary the bias angle $\alpha$ at which strips 6a, 6b, etc. are cut, motor M1 is energized via a suitable electric circuit by means of a manually controlled switch (not shown).

It will be evident from the foregoing that in order to change the bias angle $\alpha$ it is preferred not only to pivot cutter support table 4 about the pivot axis 5 but to simultaneously maintain the downstream end-extremity of the conveyor means 1 in parallelism with the cutting axis of cutter means 2. Cutter means 2 is slidably supported on three spaced planar support surfaces 40a, 40b, and 40c (FIG. 22). In response to actuation of reversible motor M1 in clockwise direction, as viewed in FIG. 9, sprockets 27 and 27' rotate the sprockets 24 in the directions indicated by the arrows through a suitable drive chain 25 (FIG. 9) and simultaneously therewith, also sprocket 28 which, it will be remembered, is the drive sprocket for pivoting the cutter table 4 about axis 5.

Externally threaded members 21a, 21c, and 21e are left-handedly threaded while alternate externally threaded members 21b, 21d and 21f are right-handedly threaded. Furthermore, the pitch of the externally threaded members varies so that the beams 12 will be shifted different distances when it is desired to change angle $\alpha$. Attention is directed to FIG. 11 where it is seen that when shifting the conveyor end extremity from the line $e$ to the line $e$ the roller 10a' shifts longitudinally a substantially greater distance than roller 10b' which latter shifts a greater distance than roller 10c'. A similar relationship exists between rollers 10a, 10b, and 10c. As an example, the externally threaded members 21a and 21f may have a lead of 10 millimeters per revolution while the lead of the externally threaded members 21b and 21e is 6 millimeters per revolution and the lead of the externally threaded members 21c and 21d is 2 millimeters per revolution.

The cutter table positioning mechanism (FIG. 17) may be located at a level below the beams 12 and may extend partially thereunder. The mechanism is shown in FIG. 17 in its end position corresponding to the minimum bias angle position. The position indicated by chain lines in FIG. 17, is the opposite end position corresponding to a maximum bias angle. In the embodiment illustrated, the externally threaded member 37 is provided with a right-hand thread having a lead of 10 millimeters per revolution and pivoting the cutter table 4, in response to clockwise rotation of motor M1, (FIG. 8) from the solid line to the chain line position indicated in FIG. 17.

It will be obvious from the foregoing that the cutter carriage means 3, including the cutter blades 45 and 46 thereof, is located at all times downstream of the end extremity of feeding means 1. Thus, in operation, the leading end of fabric 6 is fed beyond the presser means 70 onto support member 52. The latter is, of course, disposed within a space defined by the reciprocating, U-shaped, cutter housing 51 and cutter blades 45 and 46. The cut strip of fabric remaining on member 52 after each cutting stroke may then be removed by any convenient means prior to the next cutting stroke. The cutting edges of blades 45 and 46 are slightly frustoconically shaped, tapering in opposite directions and having their larger diameter portions adjacent one another.

As was noted above, the smaller the bias angle, the larger become the distortions of the fabric resulting from cutting the leading edges of consecutive strips alternately in forwardly and rearwardly directions, respectively. As the bias angle is reduced, therefore, the differential between consecutive fabric advance distances must be increased, so as to compensate for these distortions, if it is desired to cut strips of equal ultimate width.

Upon approaching the end of a forwardly directed cutting stroke, cutter carriage means 3 actuates limit switch $LS_3$ (FIG. 22) which, in turn, resets counter $C_F$ to 0 and causes switching means SL to switch the output of pulse generator $S_1$ to the input of counter $C_R$.

Upon completion of the forwardly directed cutting stroke, carriage means 3 actuates limit switch $LS_1$ which, in turn, stops the cutter carriage drive motor M3 and reverses the future direction of rotation of same, stop cutter blade drive of motor M4 and reverses the future direction of rotation of the latter. On the reverse cutting stroke, i.e., in rearwardly direction, the limit switches $LS_4$ and $LS_1$ act similarly but in an opposite sense.

We have found that even though the pressing means 70 is actuated, i.e., in pressing condition, (FIG. 27) during each of the cutting strokes, the cutting action will nevertheless result in dimensional distortion of the fabric particularly where, as here, the fabric is cut at relatively low bias angles. Furthermore, we have found that the distortions are greater in response to the cutting means moving in the forwardly direction, than in response to cutting in the reverse, i.e., rearwardly direction. The discrepancy between the strip width distortion resulting from forwardly directed cutting strokes and from rearwardly directed cutting strokes becomes greater as the bias angle is decreased. Thus, where it is desired to bias-cut consecutive strips of equal ultimate width, it is advantageous, according to the present invention, to advance the fabric, past the cutting axis, different predetermined distances preparatory to each forwardly and each rearwardly directed cutting stroke, respectively.

The foregoing concludes the detailed description of a particular embodiment of this invention. It will be obvious to those skilled in the art that various changes and modifications may be made without departing from this invention in its broader aspects, and it is, therefore, intended in the appended claims to cover all such changes and modifications as fall within the true spirit and scope of this invention.

Having thus described our invention, what we claim and desire to secure by Letters Patent is:

1. In a machine for bias cutting flexible sheet material having therein longitudinally extending reinforcing elements, in combination:

feeding means for intermittently advancing the material in longitudinal direction thereof; and cutting means including a cutter assembly supported for reciprocatory cutting movement along an axis disposed at an angle to the longitudinal axis of said feeding means, said cutter assembly being constructed and arranged to reciprocate in forwardly and rearwardly directions with respect to the direction of advance of the material, in alternating sequence with said feeding means, for bias cutting from said material alternate strips of first and second predetermined width, respectively; said feeding means comprising control means for advancing the material a predetermined first distance preparatory to each forwardly directed cutting stroke of said cutting means cutting a strip of said first width, and for advancing the material a predetermined second distance preparatory to each rearwardly directed cutting stroke of said cutting means cutting a strip of said second width, said first distance exceeding said first predetermined width by a first given amount and said second distance exceeding said second predetermined width by a second given amount, said first and second given amounts being chosen of such magnitude as to compensate for the dimensional distortion of the material resulting from bias cutting the latter alternately in said forwardly and rearwardly directions, respectively, whereby alternate ones of said bias-cut strips will display said first and second predetermined widths, respectively, said feeding means comprising material conveyor means having a transversely extending downstream end extremity and means cooperating with said end extremity for shifting the latter so as to vary the angle included between it and said longitudinal axis, and said cutting means comprising means cooperating with said cutter assembly for angularly shifting the axis along which said cutter assembly reciprocates.

2. A machine according to claim 1, wherein said feeding means comprises drive means for advancing said material, and said control means comprises sensing means for sensing the amount of movement of the material while the latter is being advanced by said drive means and counter means operatively connected to said sensing means and to said drive means for preventing further advance of the material in response to said sensing means sensing an advance of the material corresponding alternately to said predetermined first and second distances, respectively.

3. A machine according to claim 2, wherein said sensing means comprises pulse generating means and said counter means comprises resettable electronic pulse counter means in circuit with said pulse generating means.

4. A machine according to claim 3, wherein said electronic pulse counter means comprises a first and a second adjustable and resettable pulse counter for determining said first and second material advance distances, respectively, and switching means in said circuit for alternately connecting said signal generating means to said first and to said second counter in alternating sequence with said forwardly and rearwardly directed cutting strokes of said cutting means.

5. A machine according to claim 1, wherein said feeding means comprises conveyor means having a substantially horizontal conveying surface portion.

6. A machine according to claim 5, wherein said cutting means includes cutter carriage means including said cutter assembly, and cutter carriage support means comprising elongated frame means, and pivot means pivotally connecting said frame means with said feeding means in the region of said end extremity, so that said cutting axis can be positioned parallel to said end extremity.

7. The machine according to claim 1, wherein said material is tire fabric consisting of elastomeric sheet material having longitudinally extending steel strands embedded therein; and the angle between said end extremity and said longitudinal axis and between said cutting axis and said longitudinal axis, respectively, being variable between approximately 12—35 degrees.

8. A machine according to claim 1 wherein said first and second predetermined strip widths are equal, said predetermined first distance exceeding said predetermined second distance by an amount substantially equal to the strip width variations resulting from cutting consecutive transverse strips of the material in said forwardly and said rearwardly directions, respectively, said amount compensating for said dimensional variation so that consecutively cut transverse strips will have substantially identical width.

9. A machine according to claim 1, further comprising pressing means extending substantially parallely to said cutting axis closely adjacent to the upstream side thereof, said pressing means being movable between a clamping condition in which said pressing means clamp said sheet material, and a release condition in which said sheet material is free to advance, and means operatively connected to said pressing means for placing the latter in said clamping condition prior to traverse of said cutter assembly and for placing said pressing means in said release position prior to each advance of said sheet material.

10. A machine according to claim 1, wherein said cutter means comprises cutter support means including straight elongated guide means parallel to said cutting axis; said cutter means comprising cutter carriage means supported for reciprocating movement along said guide means and cutting blade means on said cutter carriage means and adapted to sever from said sheet material that portion thereof extending beyond said cutting axis.

11. A machine according to claim 10, said cutter shift means comprising pivot means supporting said cutter support means for pivotal movement thereof with respect to said feed means whereby the angle of inclination between said cutting axis and said direction of feed of the material may be varied.

12. A machine according to claim 10, wherein said cutter blade means comprises a pair of circular blades rotatably mounted on said cutter carriage means and said cutter carriage means including drive means for rotating said blades in opposite directions.

13. A machine according to claim 12, wherein said blades are mounted for rotation about axis located respectively above and below the plane of the sheet material in the region of said cutting axis.

14. A machine according to claim 13, further comprising second drive means located on said cutter support means and operatively connected to said carriage for reciprocating the latter along said guide means.

15. A machine according to claim 1, said conveyor means including an upper material conveying surface portion, said downstream and extremity being adjacent to but upstream of said cutting axis.

16. A machine according to claim 15, further comprising drive means operatively connected to said conveyor shift means and to said cutter shift means for simultaneously and correspondingly varying the angle of inclination of said cutter means and the angle of inclination of said end extremity of said conveying surface portion of said conveyor means with respect to said longitudinal axis so as to maintain said end extremity, at all positions of adjustment thereof, parallel to said cutting axis.

17. A machine according to claim 16, said cutter shift means further comprising pivot means having a vertical pivot axis located in the region of but no further downstream than said cutting axis of said cutter means.

18. In a machine for bias-cutting sheet material, in combination, conveyor means for conveying the leading end of said sheet material along a first path toward and beyond the downstream end extremity of said conveyor means, said end extremity extending generally in a direction inclined with respect to said first path and said end extremity extending generally in a direction inclined with respect to said first path and said end extremity being angularly shiftable with respect to said first path;

severing means located on the downstream side of said end extremity for severing from said sheet material a portion thereof conveyed beyond said end extremity, said severing means including cutter means and guide means guiding said cutter means for reciprocatory movement along a second path located closely adjacent and substantially parallel to said end extremity, said guide means being angularly shiftable with respect to said first path; and bias angle adjustment drive means operatively connected to said conveyor means and to said guide means for simultaneously parallely shifting both said end extremity of said conveyor means and said guide means to a predetermined angular position with respect to said first path.

19. A machine according to claim 18, further comprising support means including a support surface located in the region of but beyond said end extremity for supporting said portions of said sheet material conveyed beyond said end extremity.

20. A machine according to claim 19, wherein said support surface is elongated in direction parallel to said second path, said support surface being substantially horizontal and said severing means including a carriage member having an upper arm located above said surface, a lower arm located below said surface and a main body portion integral with said upper and lower arms and located beyond the downstream edge of said support surface, said severing means further comprising a pair of opposed cooperating cutter blades respectively carried by said upper and lower arms, and said carriage member being supported for movement lengthwise of said support surface for severing said sheet material.

21. A machine according to claim 20, wherein said cutter blades are circular and are rotatably supported by the respective support arm, and drive means located on said carriage and operatively connected to said cutter blades for simultaneously rotating the latter in opposite directions.

22. A machine according to claim 21, further comprising second drive means carried by said support means and operatively connected to said carriage for moving the latter and therewith said cutter blades along said second path.

23. A machine according to claim 20, further comprising fixed first frame means carrying said conveyor means, and said angle adjustment drive means movable second frame means carrying said conveyor means, and pivot means pivotally connecting said first and second frame means, said drive means pivoting said second frame means on said pivot means, in response to actuation of said drive means, simultaneously with and in parallelism to shifting said end extremity of said conveyor means.

24. A machine according to claim 23, wherein said second frame means comprises material support means extending substantially parallel to said second path downstream of said cutter blades and having a material support surface located intermediate said upper and lower arms of said carriage, upper and lower guide means for guiding said carriage and said material support means with respect to one another, said upper and lower guide means connected respectively to said upper and lower arms of said carriage, said upper guide means comprising a pair of axially parallel rollers located, respectively, on opposite sides of and axially parallel with said upper arm, an endless belt trained around the said rollers, and means pivotally mounting said rollers about an axis extending parallel to said second path, said rollers being positioned so that the lower run of said last mentioned endless belt engages the upper surface of the sheet material being cut, whereby the downstream portion of the sheet material is automatically pressed toward said support surface, in the region of said cutter blades, during each cutting stroke.

25. A machine according to claim 24, further comprising pressing means carried by said second frame and having a clamping portion extending substantially parallel to said second path intermediate the cutting axis of said cutting means and said end extremity for clamping the sheet material during cutting.

26. A machine according to claim 25, wherein said clamping portion comprises a plurality of inline independently movable presser members, said clamping means comprising resilient means normally urging said presser members away from said sheet material so as to permit the latter to pass freely thereunder, and inflatable means arranged to urge said presser members toward said sheet material in opposition to said resilient means for clamping the sheet material whenever said clamping means is actuated.

27. A machine according to claim 18, wherein said conveyor means comprises a plurality of substantially parallel closely spaced endless conveyor belts.

28. A machine according to claim 27, wherein said conveyor means comprises a plurality of independently movable guide rolls, at the downstream end thereof, said rolls being arranged axially parallel with respect to each other, and a common drive drum in the region of the upstream end thereof axially parallel to and having a length at least as great as the combined lengths of said guide rolls, said endless belts being trained around said drive drum and around the respective guide rolls.

29. A machine according to claim 28, further comprising a plurality of elongated motion transmitting beams positioned parallely to said first path and each supporting at one end thereof one of said guide rolls, said beams being shiftable longitudinally to shift said guide rolls, the latter having exterior portions which together define said end extremity.

30. A machine according to claim 29, said angle adjustment drive being operatively connected to said beams for shifting each thereof a predetermined amount when said later drive means is actuated, said latter drive means being adapted to shift those of said beams located on one side of the axis of said conveyor means and those located on the opposite side of said axis in opposite directions parallel to said first path, said latter drive means shifting the opposite outermost beams a substantially greater distance than the opposite innermost beams.

31. A machine according to claim 30, wherein said latter drive means is located in the region of the upstream end of said conveyor means, each of said beams having an upper substantially horizontal guide surface for supporting the upper run of the respective conveyor belt.

32. A machine according to claim 29, comprising fixed first frame means carrying said conveyor means, movable second frame means carrying said severing means, pivot means located in the region of the end extremity of said conveyor means for pivotally connecting thereto said second frame means so that the angle of inclination of said movable second with respect to said fixed first frame means can be changed, and coupling means operatively connecting said angle adjustment drive means to said beams, said coupling means operatively connecting said angle adjustment drive means to said beams, said coupling means comprising for each of said elongated motion transmitting beams an internally threaded member rotatably fixed to said first frame means and an elongated screw member threadedly received in said internally threaded member and axially movable therein in response to rotation of said internally threaded member.

33. A machine according to claim 32, wherein said screw members are parallely arranged in the region of said upstream end of said first frame means and operatively connected to the respective motion transmitting beams so as to move the latter longitudinally in response to rotation of the respective internally threaded members, consecutive ones of said screw members as seen in directions away from the axis of said conveyor means, having consecutively greater lead lengths with corresponding screw members on opposite sides of said axis having equal lead lengths, and said coupling means comprising means operatively connected to said screw members for moving those of said screw members on one side of said conveyor axis in upstream direction while simultaneously moving those located on the other side of said axis in downstream direction.

34. A machine according to claim 32, further comprising motion transmitting means carried by said first frame means and operatively connected to said second frame means for turning the latter about the axis of said pivot means so as to change said angle of inclination, said motion transmitting means comprising rod means movable axially along an axis spaced from said pivot axis and substantially parallel to the axis of said first frame means, fixed first guide means aligned with said rod means for guiding one end portion of said rod means for axial movement, second guide means located on said movable second frame means, the axis of said second guide means passing through the axis of said pivot means and being substantially normal thereto and said guide means being in partial overlapping relationship and inclined with respect to each other, said end portion of said rod means being simultaneously in engagement with portions of both of said guide means so as to pivot said movable second frame means with respect to said fixed first frame means in response to axial movement of said rod means.

35. A machine according to claim 34, wherein each of said guide means comprises parallely arranged opposite vertical guide surfaces adapted to slidingly received said end portion of said rod means therebetween, said guide surfaces of one of said guide means being included with respect to said guide surfaces of the other of said guide means and said coupling means being operatively connected to said rod means for turning said second frame angularly about said pivot axis while simultaneously axially moving said beams, whereby said end extremity will automatically be parallel to said second path for all angular positions of adjustment.